(12) United States Patent
Yoshimura et al.

(10) Patent No.: US 11,445,532 B2
(45) Date of Patent: Sep. 13, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Taewoo Lee, Sakai (JP); Huifa Lin, Sakai (JP); Toshizo Nogami, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 17/255,461

(22) PCT Filed: Jun. 28, 2019

(86) PCT No.: PCT/JP2019/025834
§ 371 (c)(1),
(2) Date: Dec. 23, 2020

(87) PCT Pub. No.: WO2020/004627
PCT Pub. Date: Jan. 2, 2020

(65) Prior Publication Data
US 2021/0321432 A1 Oct. 14, 2021

(30) Foreign Application Priority Data
Jun. 29, 2018 (JP) .............................. JP2018-124641

(51) Int. Cl.
H04W 72/12 (2009.01)
H04L 1/18 (2006.01)

(52) U.S. Cl.
CPC ....... *H04W 72/1268* (2013.01); *H04L 1/1819* (2013.01); *H04L 1/1896* (2013.01); *H04W 72/1226* (2013.01); *H04W 72/1242* (2013.01)

(58) Field of Classification Search
CPC ......... H04W 72/1268; H04W 72/1226; H04W 72/1242; H04W 24/10; H04L 1/1819;
(Continued)

(56) References Cited

U.S. PATENT DOCUMENTS

2012/0033587 A1* 2/2012 Papasakellariou .... H04L 1/1671
370/277
2012/0250648 A1* 10/2012 Xia ........................ H04L 1/0057
370/329
(Continued)

OTHER PUBLICATIONS

Intel Corporation (Indicated in IDS "Multiple UCI types in a PUCCH", 3GPP TSG RAN WG1 #93 R1-1806519, May 12, 2018) (Year: 2018).*
(Continued)

*Primary Examiner* — Hardikkumar D Patel
(74) *Attorney, Agent, or Firm* — Keating & Bennett, LLP

(57) ABSTRACT

A terminal apparatus includes a receiver configured to receive a physical downlink shared channel and a transmitter configured to multiplex first channel state information having a higher priority than second channel state information with the second channel state information and an HARQ-ACK and to transmit the first channel state information, the second channel state information and the HARQ-ACK multiplexed, by using a physical uplink control channel resource.

4 Claims, 14 Drawing Sheets

(58) Field of Classification Search
CPC ... H04L 1/1896; H04L 1/1671; H04L 1/1861; H04L 5/0064; H04L 5/001; H04L 5/0023; H04L 5/0053; H04L 5/0083; H04L 5/0094; H04L 27/2602
See application file for complete search history.

(56) References Cited

U.S. PATENT DOCUMENTS

2018/0352545 A1* 12/2018 Takeda .................... H04L 5/001
2019/0335449 A1* 10/2019 Xiong ................... H04L 5/0037

OTHER PUBLICATIONS

LG electronics ("Remaining issues on long-duration PUCCH", 3GPP TSG RAN WG1 #93 R1-1806621, May 12, 2018) (Year: 2018).*
LG Electronics, "Remaining issues on short-duration PUCCH", 3GPP TSG RAN WG1 Meeting #93, R1-1806620, May 21-25, 2018, 6 pages.
Official Communication issued in International Patent Application No. PCT/JP2019/025834, dated Sep. 3, 2019.
NTT DoCoMo, "New SID Proposal: Study on New Radio Access Technology", 3GPP TSG RAN Meeting #71, RP-160671, Mar. 7-10, 2016, 8 pages.
Intel Corporation, "Multiple UCI types in a PUCCH", 3GPP TSG RAN WG1 Meeting #93, R1-1806519, May 21-25, 2018, pp. 1-4.
LG Electronics, "Remaining issues on long-duration PUCCH", 3GPP TSG RAN WG1 Meeting #93, R1-1806621, May 21-25, 2018, 6 pages.
LG Electronics, "Remaining issues on long-duration PUCCH", 3GPP TSG RAN WG1 Meeting #93, R1-1806620, May 21-25, 2018, 6 pages.
Samsung, "CR to TS 38.213 capturing the RAN #92bis and RAN #93 meeting agreements and aligning higher layer parameters with TS 38.331", 3GPP TSG-RAN1 Meeting #93, R1-1807957, May 21-25, 2018, 10 pages.
"3rd Generation Partnership Project; Technical Specification Group Radio Access Network; NR; Physical layer procedures for control (Release 15)", 3GPP TS 38.213 V15.2.0, Jun. 2018, pp. 1-97.

* cited by examiner

Figure A: Number of OFDM symbols per slot, slots per frame, and slots per subframe for normal cyclic prefix.

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 2

| PUCCH format | Length in OFDM symbols $N^{PUCCH}_{symb}$ |
|---|---|
| 0 | 1 - 2 |
| 1 | 4 - 14 |
| 2 | 1 - 2 |
| 3 | 4 - 14 |
| 4 | 4 - 14 |

FIG. 4

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2018-124641 filed on Jun. 29, 2018, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as user equipment (UE). LTE is a cellular communication system in which multiple areas are deployed in a cell structure, with each of the multiple areas being covered by a base station apparatus. A single base station apparatus may manage multiple serving cells.

3GPP has been studying a next generation standard (New Radio or NR) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology," RP-160671, NTT docomo, 3GPP TSG RAN Meeting #71, Goteborg, Sweden, 7 to 10 Mar. 2016.

SUMMARY OF INVENTION

Technical Problem

One aspect of the present invention provides a terminal apparatus capable of efficiently performing communication, a communication method used for the terminal apparatus, a base station apparatus capable of efficiently performing communication, and a communication method used for the base station apparatus.

Solution to Problem (1) A first aspect of the present invention is a terminal apparatus including a receiver configured to receive a physical downlink shared channel and a transmitter configured to multiplex first channel state information with a higher priority than second channel state information, with the second channel state information and an HARQ-ACK and to transmit the first channel state information, the second channel state information and the HARQ-ACK multiplexed, by using a physical uplink control channel resource, wherein in a first case that at least one OFDM symbol of multiple OFDM symbols to which a first physical uplink control channel resource for the first channel state information is mapped is identical to one OFDM symbol of multiple OFDM symbols to which a second physical uplink control channel resource for the HARQ-ACK is mapped and that at least one OFDM symbol of multiple OFDM symbols to which a third physical uplink control channel resource for the second channel state information is mapped is identical to the one OFDM symbol of the multiple OFDM symbols to which the second physical uplink control channel resource is mapped, the transmitter does not multiplex the second channel state information with the first channel state information and the HARQ-ACK.

(2) A second aspect of the present invention is the terminal apparatus according to (1) described above, wherein, in a second case in which a higher layer parameter multi-CSI-PUCCH-resourcelist is not configured in the first case, the transmitter does not multiplex the second channel state information with the first channel state information and the HARQ-ACK, and the multiple pieces of channel state information are multiplexed on a physical uplink control channel included in the higher layer parameter multi-CSI-PUCCH-resourcelist.

(3) A third aspect of the present invention is the terminal apparatus according to (2) described above, wherein, in a third case in which the higher layer parameter multi-CSI-PUCCH-resourcelist is configured in the first case, the transmitter multiplexes the first channel state information, the second channel state information, and the HARQ-ACK.

(4) A fourth aspect of the present invention is a base station apparatus including a transmitter configured to transmit a physical downlink shared channel; and a receiver configured to receive first channel state information, second channel state information, and a HARQ-ACK for the physical downlink shared channel multiplexed, by using a physical uplink control channel resource, wherein the first channel state information has a higher priority than the second channel state information, the first channel state information is multiplexed with the second channel state information and the HARQ-ACK, and in a first case that at least one OFDM symbol of multiple OFDM symbols to which a first physical uplink control channel resource for the first channel state information is mapped is identical to one OFDM symbol of multiple OFDM symbols to which a second physical uplink control channel resource for the HARQ-ACK is mapped and that at least one OFDM symbol of multiple OFDM symbols to which a third physical uplink control channel resource for the second channel state information is mapped is identical to the one OFDM symbol of the multiple OFDM symbols to which the second physical uplink control channel resource is mapped, the second channel state information is not multiplexed with the first channel state information and the HARQ-ACK.

A fifth aspect of the present invention is a communication method used for a terminal apparatus, the communication method including the steps of: receiving, by a computer for the terminal apparatus, a physical downlink shared channel; and multiplexing, by a computer for the terminal apparatus, first channel state information with a higher priority than second channel state information with the second channel state information and an HARQ-ACK and transmitting the first channel state information, the second channel state information and the HARQ-ACK multiplexed, by using a physical uplink control channel resource, wherein in a first case that at least one OFDM symbol of multiple OFDM symbols to which a first physical uplink control channel resource for the first channel state information is mapped is identical to one OFDM symbol of multiple OFDM symbols to which a second physical uplink control channel resource for the HARQ-ACK is mapped and that at least one OFDM symbol of multiple OFDM symbols to which a third physical uplink control channel resource for the second channel state information is mapped is identical to the one OFDM symbol of the multiple OFDM symbols to which the second physical uplink control channel resource is mapped, in the step of transmitting, the second channel state information is not multiplexed with the first channel state information and the HARQ-ACK.

A sixth aspect of the present invention is a communication method used for a base station apparatus, the communication method including the steps of: transmitting, by a computer for the base station apparatus, a physical downlink shared channel; and receiving, by a computer for the base station apparatus, first channel state information, second channel state information, and a HARQ-ACK for the physical downlink shared channel multiplexed, by using a physical uplink control channel resource, wherein the first channel state information has a higher priority than the second channel state information, the first channel state information is multiplexed with the second channel state information and the HARQ-ACK, and in a first case that at least one OFDM symbol of multiple OFDM symbols to which a first physical uplink control channel resource for the first channel state information is mapped is identical to one OFDM symbol of multiple OFDM symbols to which a second physical uplink control channel resource for the HARQ-ACK is mapped and that at least one OFDM symbol of multiple OFDM symbols to which a third physical uplink control channel resource for the second channel state information is mapped is identical to the one OFDM symbol of the multiple OFDM symbols to which the second physical uplink control channel resource is mapped, the second channel state information is not multiplexed with the first channel state information and the HARQ-ACK.

Advantageous Effects of Invention

According to one aspect of the present invention, the terminal apparatus can efficiently perform communication. In addition, the base station apparatus can efficiently perform communication.

BRIEF DESCRIPTION OF DRAWINGS

FIG. 2 is an example illustrating a relationship between $N^{slot}_{symb}$, a subcarrier spacing configuration μ, and a CP configuration according to an aspect of the present embodiment.

FIG. 4 is a diagram illustrating an example of a relationship between a PUCCH format and a length $N^{PUCCH}_{symb}$ of the PUCCH format according to an aspect of the present embodiment.

DESCRIPTION OF EMBODIMENTS

Embodiments of the present invention will be described below.

Figure 1:
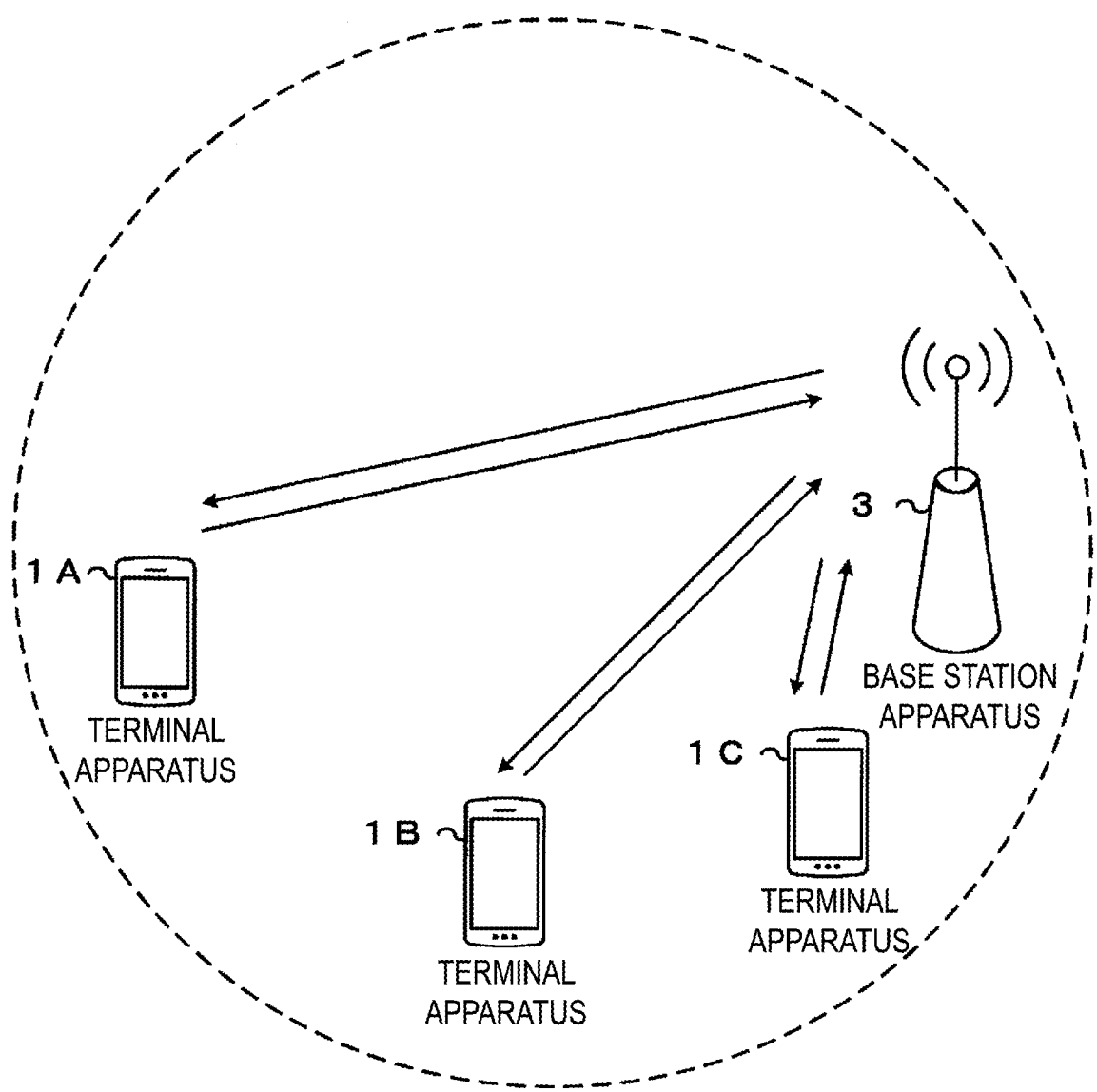
FIG. 1 is a conceptual diagram of a radio communication system according to one aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

A frame structure will now be described.

In the radio communication system according to an aspect of the present embodiment, at least Orthogonal Frequency Division Multiplexing (OFDM) is used. An OFDM symbol is a unit of a time domain for OFDM. The OFDM symbol includes at least one or more subcarriers. The OFDM symbol is converted into a time-continuous signal in generation of a baseband signal. In a downlink, at least Cyclic Prefix-Orthogonal Frequency Division Multiplexing (CP-OFDM) is used. In an uplink, one of CP-OFDM or Discrete Fourier Transform-spread-Orthogonal Frequency Division Multiplexing (DFT-s-OFDM) is used. The DFT-s-OFDM may be provided by applying a Transform precoding to CP-OFDM.

A SubCarrier Spacing (SCS) may be given by subcarrier spacing $\Delta f = 2\mu * 15$ kHz. For example, the subcarrier spacing configuration μ may be one of 0, 1, 2, 3, 4, and/or 5. For a certain BandWidth Part (BWP), the subcarrier spacing configuration μ may be given by a higher layer parameter.

In the radio communication system according to an aspect of the present embodiment, a time unit $T_c$ is used for representing a length of the time domain. The time unit $T_c$ may be given by $T_c = 1/(\Delta f_{max} * N_f)$. $\Delta f_{max}$ may be the maximum value of the subcarrier spacing supported by the radio communication system according to an aspect of the present embodiment. $\Delta f_{max}$ may be $\Delta f_{max}$=480 kHz. $N_f$ may be $N_f$=4096. A constant $\kappa$ is $\kappa=\Delta f_{max}*N_f/(\Delta_{ref}N_{f,ref})$=64. $\Delta f_{ref}$ may be 15 kHz. $N_{f,ref}$ may be 2048.

The constant $\kappa$ may be a value indicating a relationship between a reference subcarrier spacing and $T_c$. The constant $\kappa$ may be used for a length of a subframe. The number of slots included in the subframe may be given at least based on the constant $\kappa$. $\Delta f_{ref}$ is the reference subcarrier spacing, and $N_{f,ref}$ is a value corresponding to the reference subcarrier spacing.

Downlink signal transmission and/or uplink signal transmission is configured with 10 ms frames. A frame is configured to include 10 subframes. A length of the subframe is 1 ms. The length of the frame may be given regardless of the subcarrier spacing $\Delta f$. That is, the frame configuration may be given independently of $\mu$. The length of the subframe may be given regardless of the subcarrier spacing $\Delta f$. That is, the subframe configuration may be given independently of $\mu$.

For a certain subcarrier spacing configuration $\mu$, the number and indices of slots included in a subframe may be given. For example, a slot number $n^{\mu}_s$ may be given in ascending order within a range from 0 to $N^{subframe,\mu}_{slot}-1$ in a subframe. For the subcarrier spacing configuration $\mu$, the number and indices of slots included in a frame may be given. Additionally, a slot number $n^{\mu}_{s,f}$ may be given in ascending order within a range from 0 to $N^{frame,\mu}_{slot}-1$ in a frame. $N^{slot}_{symb}$ continuous OFDM symbols may be included in one slot. $N^{slot}_{symb}$ may be given based at least on part or all of a Cyclic Prefix (CP) configuration. The CP configuration may be given at least based on a higher layer parameter. The CP configuration may be given based at least on dedicated RRC signaling. The slot number is also referred to as a slot index.

FIG. 2 is an example illustrating a relationship between $N^{slot}_{symb}$, the subcarrier spacing configuration $\mu$, and the CP configuration according to an aspect of the present embodiment. In FIG. 2A, in a case that, for example, the subcarrier spacing configuration $\mu$ is 2 and the CP configuration is a normal cyclic prefix (normal CP), $N^{slot}_{symb}=14$, $N^{frame,\mu}_{slot}=40$, and $N^{subframe,\mu}_{slot}=4$. In addition, in FIG. 2B, for example, in a case that the subcarrier spacing configuration $\mu$ is 2 and the CP configuration is an extended cyclic prefix (extended CP), $N^{slot}_{symb}=12$, $N^{frame,\mu}_{slot}=40$, and $N^{subframe,\mu}_{slot}=4$.

Physical resources will be described below.

An antenna port is defined in such a manner that a channel on which a symbol on one antenna port is conveyed can be inferred from a channel on which another symbol on the same antenna port is conveyed. In a case that a large scale property of the channel on which the symbol on one antenna port is conveyed can be inferred from the channel on which the symbol on another antenna port is conveyed, the two antenna ports are said to be Quasi Co-Located (QCL). The large scale property may include at least a long term performance of a channel. The large scale property may include at least some or all of delay spread, Doppler spread, Doppler shift, average gain, average delay, and beam parameters (spatial Rx parameters). A first antenna port and a second antenna port being QCL with respect to a beam parameter may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case that a large scale property of a channel on which a symbol on one antenna port is conveyed is inferred from a channel on which a symbol on another antenna port is conveyed, the terminal apparatus 1 may assume the two antenna ports to be QCL. Two antenna pons being QCL may mean that the two antenna pons are assumed to be QCL.

For configuration of the subcarrier spacing and a set of carriers, a resource grid defined by $N^{size,\mu}_{grid,x}N^{RB}_{sc}$ subcarriers and $N^{subframe,\mu}_{symb}$ OFDM symbols is given. $N^{size,\mu}_{grid,x}$ may indicate the number of resource blocks given for the subcarrier spacing configuration $\mu$ for a carrier x. $N^{size,\mu}_{grid,x}$ may indicate the bandwidth of the carrier. $N^{size,\mu}_{grid,x}$ may correspond to the value of the higher layer parameter CarrierBandwidth. The carrier x may indicate either a downlink carrier or an uplink carrier. In other words, x may be one of "DL" or "UL." $N^{RB}_{sc}$ may indicate the number of subcarriers included in one resource block. The $N^{RB}_{sc}$ may be 12. At least one resource grid may be given for each antenna port p and/or for each subcarrier spacing configuration $\mu$ and/or for each Transmission direction configuration. The transmission direction includes at least Downlink (DL) and Uplink (UL). Hereinafter, a set of parameters including at least some or all of the antenna port p, the subcarrier spacing configuration $\mu$, and the transmission direction configuration is also referred to as a first radio parameter set. That is, one resource grid may be given for each first radio parameter set.

A carrier included in a serving cell in the downlink is referred to as a downlink carrier (or a downlink component carrier). A carrier included in a serving cell in uplink is referred to as an uplink carrier (uplink component carrier). The downlink component carrier and the uplink component carrier are collectively referred to as a component carrier (or a carrier).

Each element in the resource grid given for each first radio parameter set is referred to as a resource element. The resource element is identified by an index $k_{sc}$ of the frequency domain and an index $l_{sym}$ of the time domain. For a certain first radio parameter set, the resource element is identified by an index $k_{sc}$ of the frequency domain and an index $l_{sym}$ of the time domain. The resource element identified by the index $k_{sc}$ of the frequency domain and the index $l_{sym}$ of the time domain is also referred to as a resource element $(k_{sc}, l_{sym})$. The index $k_{sc}$ of the frequency domain indicates any value from 0 to $N^{\mu}_{RB}N^{RB}_{sc}-1$. $N^{\mu}_{RB}$ may be the number of resource blocks given for the subcarrier spacing configuration $\mu$. $N^{\mu}_{RB}$ may be $N^{size,\mu}_{grid,x}$. $N^{RB}_{sc}$ is the number of subcarriers included in a resource block, and $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$.

Figure 3:
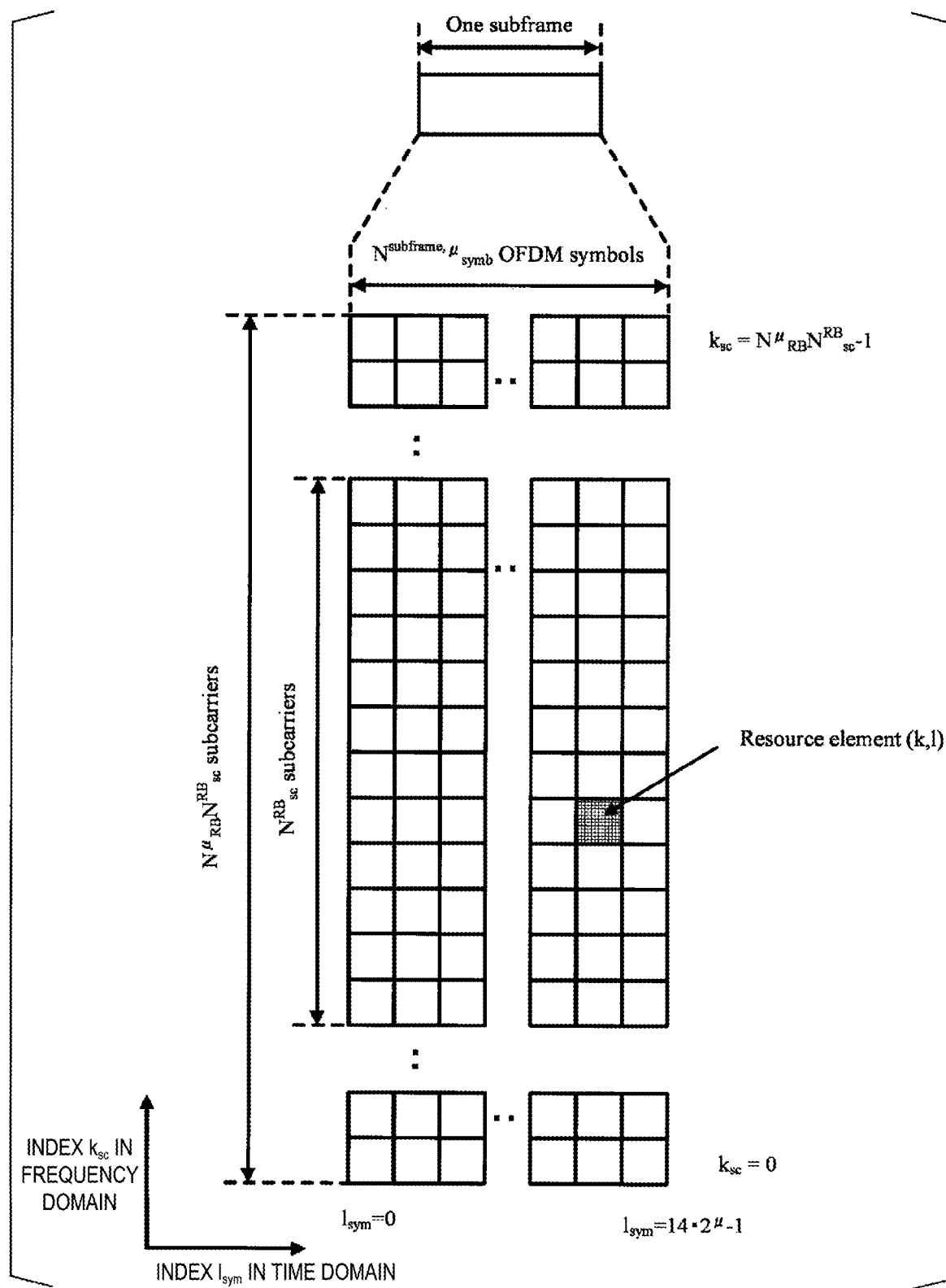
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid of FIG. 3, the horizontal axis is the index $l_{sym}$ of the time domain, and the vertical axis is the index $k_{sc}$ of the frequency domain. In one subframe, the frequency domain of the resource grid includes $N^{\mu}_{RB}N^{RB}_{sc}$ subcarriers. In one subframe, the time domain of the resource grid may include $14*2\mu$ OFDM symbols. One resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive indication to perform transmission and/or reception by using only a subset of the resource grid. The subset of the resource grid is also referred to as a BWP, and the BWP may be given at least based on a higher layer parameter and/or a part or all of DCI. The BWP is also referred to as a Carrier Bandwidth Part. The terminal apparatus 1 need not receive an indication to perform transmission and/or reception by using all sets of resource grids. The terminal apparatus 1 may receive an indication to perform transmission and/or reception by using some frequency resources within the resource grid. One BWP may include multiple resource blocks in the frequency domain. One BWP may include multiple continuous resource blocks in the frequency domain. A BWP configured for a downlink carrier is also referred to as a downlink BWP. A BWP configured for an uplink carrier is also referred to as an uplink BWP.

One or multiple downlink BWPs may be configured for each serving cell. One or more uplink carrier bandwidth parts may be configured for each serving cell.

A higher layer parameter is a parameter included in higher layer signaling. The higher layer signaling may be a Radio Resource Control (RRC) signaling or a Medium Access Control Control Element (MAC CE). Here, the higher layer signaling may be RRC layer signaling or MAC layer signaling.

The higher layer signaling may be common RRC signaling. The common RRC signaling may include at least some or all of the following features C1 to C3.

Feature C1) The common RRC signaling is mapped to a BCCH logical channel or to a CCCH logical channel.

Feature C2) The common RRC signaling includes at least ReconfigurationWithSync information element.

Feature C3) The common RRC signaling is mapped to a PBCH.

The ReconfigurationWithSync information element may include information indicating a configuration commonly used in the serving cell. The configuration commonly used in the serving cell may include at least a PRACH configuration. The PRACH configuration may indicate at least one or multiple random access preamble indices. The PRACH configuration may indicate at least a time/frequency resource of a PRACH.

The common RRC signaling may include at least a common RRC parameter. The common RRC parameter may be a (Cell-specific) parameter commonly used in the serving cell.

The higher layer signaling may be dedicated RRC signaling. The dedicated RRC signaling may include at least some or all of the following features D1 and D2.

Feature D1) The dedicated RRC signaling is mapped to a DCCH logical channel.

Feature D2) The dedicated RRC signaling includes no ReconfigurationWithSync information element.

For example, a Master Information Block (MIB) and a System Information Block (SIB) may be included in the common RRC signaling. In addition, a higher layer message mapped to the DCCH logical channel and including at least a ReconfigurationWithSync information element may be included in the common RRC signaling. In addition, a higher layer message mapped to the DCCH logical channel and including no ReconfigurationWithSync information element may be included in the dedicated RRC signaling.

The SIB may indicate at least a time index of a Synchronization Signal (SS) block. The SS block is also referred to as a SS/PBCH block. The SIB may include at least information associated with a PRACH resource. The SIB may include at least information associated with a configuration of initial connection.

The ReconfigurationWithSync information element may include at least information associated with the PRACH resource. The ReconfigurationWithSync information element may include at least information associated with the configuration of initial connection.

The dedicated RRC signaling may include at least a dedicated RRC parameter. The dedicated RRC parameter may be a (UE-specific) parameter dedicated to the terminal apparatus 1. The dedicated RRC signaling may include at least a common RRC parameter.

The common RRC parameter and the dedicated RRC parameter are also referred to as higher layer parameters.

A physical channel and a physical signal according to various aspects of the present embodiment will be described below.

An uplink physical channel may correspond to a set of resource elements that conveys information generated in a higher layer. The uplink physical channel is a physical channel used in the uplink carrier. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes some or all of Channel State Information (CSI), a Scheduling Request (SR), and a Hybrid Automatic Repeat request ACKnowledgement (HARQ-ACK) information corresponding to a Transport block (TB, a Medium Access Control Protocol Data Unit (MAC PDU), a Downlink-Shared Channel (DL-SCH), or a Physical Downlink Shared Channel (PDSCH)).

The uplink control information may be multiplexed on the PUCCH. The multiplexed PUCCH may be transmitted.

The HARQ-ACK information may include at least HARQ-ACK bits corresponding to the transport block. The HARQ-ACK bits may indicate an acknowledgement (ACK) or a negative-acknowledgement (NACK) corresponding to the transport block. The ACK may be a value indicating that decoding of the transport block has been successfully completed. The NACK may be a value indicating that decoding of the transport block has not been successfully completed. The HARQ-ACK information may include at least one HARQ-ACK codebook including one or more HARQ-ACK bits. The HARQ-ACK bit corresponding to one or multiple transport blocks may mean that the HARQ-ACK bit corresponds to the PDSCH including the one or multiple transport blocks.

The HARQ-ACK bit may indicate an ACK or a NACK corresponding to one Code Block Group (CBG) included in the transport block. The HARQ-ACK is also referred to as HARQ feedback, HARQ information, and HARQ control information.

The Scheduling Request (SR) may be used at least to request a PUSCH resource for the initial transmission. The scheduling request bits may be used to indicate one of positive SR or negative SR. The scheduling request bits indicating the positive SR are also referred to as "the positive SR being transmitted." The positive SR may indicate that a PUSCH resource for the initial transmission is requested by the terminal apparatus 1. The positive SR may indicate that the scheduling request is triggered by a higher layer. The positive SR may be transmitted in a case that the higher layer indicates a transmission of the scheduling request. The scheduling request bits indicating the negative SR are also referred to as "the negative SR being transmitted." The negative SR may indicate that no PUSCH resource for the initial transmission is requested by the terminal apparatus 1. The negative SR may indicate that the scheduling request is not triggered by the higher layer. The negative SR may be transmitted in a case that the higher layer does not indicate a transmission of the scheduling request.

The scheduling request bits may be used to indicate one of the positive SR or the negative SR for one or any of multiple SR configurations. Each of the one or multiple SR configurations may correspond to one or multiple logical channels. The positive SR for a certain SR configuration may be the positive SR for any or all of the one or more logical channels corresponding to the certain SR configuration. The negative SR need not correspond to a particular SR configuration. Indication of the negative SR may correspond to indication of the negative SR for all SR configurations.

The SR configuration may be a Scheduling Request ID. The scheduling request ID may be given by a higher layer parameter.

The channel state information may include at least some or all of a Channel Quality Indicator (CQI), a Precoder Matrix Indicator (PMI), and a Rank Indicator (RI). The CQI is an indicator associated with channel quality (e.g., propagation strength), and the PMI is an indicator indicating a precoder. The RI is an indicator indicating a transmission rank (or the number of transmission layers).

The channel state information may be given based at least on reception of a physical signal (e.g., CSI-RS) used at least for channel measurement. The channel state information may include a value selected by the terminal apparatus 1. The channel state information may be selected by the terminal apparatus 1 based at least on reception of a physical signal used at least for channel measurement. The channel measurement includes interference measurement.

The channel state information report is a report of channel state information. The channel state information report may include a CSI part 1 and/or a CSI part 2. The CSI part 1 may include at least some or all of wideband channel quality information (CQI), wideband precoder matrix index (PMI), and the rank indicator. The number of bits of the CSI part 1 multiplexed with the PUCCH may be a prescribed value regardless of the value of the rank indicator in the channel state information report. The number of bits of the CSI part 2 multiplexed with the PUCCH may be given based on the value of the rank indicator in the channel state information report. The rank indicator in the channel state information report may be the value of the rank indicator used for calculation of the channel state information report. The rank indicator in the channel state information may be a value indicated by a rank indicator field included in the channel state information report.

The set of rank indicators permitted in the channel state information report may include some or all of 1 to 8. The set of rank indicators permitted in the channel state information report may be given based at least on the higher layer parameter RankRestriction. In a case where the set of rank indicators permitted in the channel state information report includes only one value, the rank indicator of the channel state information report may be the one value.

Priorities may be configured for the channel state information report. The priority for the channel state information report may be given based at least on some or all of a configuration related to the behavior of the time domain of the channel state information report, the type of contents of the channel state information report, the index of the channel state information report, and/or the index of the serving cell for which the measurement for the channel state information report is configured.

The configuration related to the behavior of the time domain of the channel state information report may be a configuration indicating whether the channel state information report is aperiodically, semi-persistently or semi-statically performed.

The type of contents of the channel state information report may indicate whether the channel state information report includes a Reference Signals Received Power (RSRP) of the layer 1.

The index of the channel state information report may be given by a higher layer parameter.

The PUCCH supports PUCCH formats (PUCCH format 0 to PUCCH format 4). The PUCCH formats may be transmitted on the PUCCH. The transmission of the PUCCH formats may correspond to the transmission of the PUCCH.

FIG. 4 is a diagram illustrating an example of a relationship between a PUCCH format and a length $N^{PUCCH}_{symb}$ of the PUCCH format according to an aspect of the present embodiment. The length $N^{PUCCH}_{symb}$ of PUCCH format 0 is 1 or 2 OFDM symbols. The length $N^{PUCCH}_{symb}$ of PUCCH format 1 is one of 4 to 14 OFDM symbols. The length $N^{PUCCH}_{symb}$ of PUCCH format 2 is 1 or 2 OFDM symbols. The length $N^{PUCCH}_{symb}$ of PUCCH format 3 is one of 4 to 14 OFDM symbols. The length $N^{PUCCH}_{symb}$ of PUCCH format 4 is one of 4 to 14 OFDM symbols.

The PUSCH is used at least to transmit the transport block (TB, MAC PDU, and UL-SCH). The PUSCH may be used to transmit at least some or all of the transport block, the HARQ-ACK information, the channel state information, and the scheduling request. The PUSCH is used at least to transmit a random access message 3.

The PRACH is used at least to transmit a random access preamble (random access message 1). The PRACH may be used at least to indicate some or all of an initial connection establishment procedure, a handover procedure, a connection re-establishment procedure, synchronization for a PUSCH transmission (timing adjustment), and a request for a resource for the PUSCH. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of a PUSCH and/or a PUCCH. The UL DMRS is multiplexed with the PUSCH or the PUCCH. The base station apparatus 3 may use the UL DMRS in order to perform channel compensation of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The SRS may not be associated with transmission of the PUSCH or the PUCCH. The base station apparatus 3 may use the SRS for measuring a channel state. The SRS may be transmitted at the end of a subframe in an uplink slot or in a prescribed number of OFDM symbols from the end.

The UL PTRS may be a reference signal that is at least used for phase tracking. The UL PTRS may be associated with a UL DMRS group including at least an antenna port used for one or multiple UL DMRSs. The association of the UL PTRS with UL DMRS group may mean that the antenna port for the UL PTRS and some or all of the antenna ports included in the UL DMRS group are at least QCL. The UL DMRS group may be identified at least based on the antenna port of the lowest index for the UL DMRS included in the UL DMRS group. The UL PTRS may be mapped to one antenna port of one or multiple antenna ports to which one codeword is mapped, the one antenna port having the smallest index. The UL PTRS may be mapped to the first layer in a case that one codeword is mapped at least to the first layer and the second layer. The UL PTRS need not be mapped to the second layer. The index of the antenna port to which the UL PTRS is mapped may be given based at least on the downlink control information.

In FIG. 1, the following downlink physical channels are used for downlink radio communication from the base station apparatus 3 to the terminal apparatus 1. The downlink physical channels are used by the physical layer for transmission of information output from a higher layer.

Physical Broadcast Channel (PBCH)
Physical Downlink Control Channel (PDCCH)
Physical Downlink Shared Channel (PDSCH)

The PBCH is used at least to transmit the MIB and/or a PBCH payload. The PBCH payload may include at least information indicating an index related to the transmission timing for the SS block. The PBCH payload may include information related to the identifier (index) of the SS block. The PBCH may be transmitted at a prescribed transmission interval. The PBCH may be transmitted at an interval of 80 ms. The PBCH may be transmitted at an interval of 160 ms. Contents of information included in the PBCH may be updated at every 80 ms. Some or all of the contents of information included in the PBCH may be updated at every 160 ms. The PBCH may include 288 subcarriers. The PBCH may include 2, 3, or 4 OFDM symbols. The MIB may include information associated with the identifier (index) of the SS block. The MIB may include information indicating at least some of numbers of a slot, a subframe, and/or a radio frame in which a PBCH is transmitted.

The PDCCH is used at least to transmit Downlink Control Information (DCI). The PDCCH transmitted may include at least the downlink control information. The downlink control information may be mapped to the PDCCH. The downlink control information is also called a DCI format. The downlink control information may indicate at least one of a downlink grant or an uplink grant. The DCI format used for scheduling of the PDSCH is also referred to as a downlink DCI format. The DCI format used for scheduling of the PUSCH is also referred to as an uplink DCI format. The downlink grant is also referred to as downlink assignment or downlink allocation.

In various aspects of the present embodiment, unless otherwise specified, the number of resource blocks indicates the number of resource blocks in the frequency domain.

A single physical channel may be mapped to a single serving cell. A single physical channel may be mapped to a single carrier bandwidth part configured for a single carrier included in the single serving cell.

The terminal apparatus 1 is provided with one or multiple COntrol REsource SETs (CORESETs). The terminal apparatus 1 monitors the PDCCH in one or multiple control resource sets.

The control resource set may indicate a time-frequency domain to which one or multiple PDCCHs can be mapped. The control resource set may be a region in which the terminal apparatus 1 monitors the PDCCH. The control resource set may include continuous resources (Localized resources). The control resource set may include non-continuous resources (distributed resources).

In the frequency domain, the unit of mapping the control resource set may use a resource block. In the frequency domain, for example, the unit of mapping the control resource set may be six resource blocks. In the time domain, the unit of mapping the control resource set may use an OFDM symbol. In the time domain, for example, the unit of mapping the control resource set may be one OFDM symbol.

The frequency domain of the control resource sets may be given at least based on higher layer signaling and/or downlink control information.

The time domain of the control resource sets may be given based at least on higher layer signaling and/or downlink control information.

A certain control resource set may be a Common control resource set. The common control resource set may be a control resource set configured commonly to multiple terminal apparatuses 1. The common control resource set may be given based at least on some or all of the MIB, the SIB, the common RRC signaling, and a cell ID. For example, a time resource and/or a frequency resource for the control resource set configured to monitor the PDCCH to be used for scheduling of the SIB may be given based at least on the MIB.

A certain control resource set may be a Dedicated control resource set. The dedicated control resource set may be a control resource set configured to be used exclusively for the terminal apparatus 1. The dedicated control resource set may be provided based at least on dedicated RRC signaling.

A set of candidates for the PDCCH monitored by the terminal apparatus 1 may be defined from the perspective of a search space. In other words, the set of PDCCH candidates monitored by the terminal apparatus 1 may be provided by the search space.

The search space may include one or multiple PDCCH candidates of one or multiple Aggregation levels. The aggregation level of the PDCCH candidates may indicate the number of CCEs constituting the PDCCH.

The terminal apparatus 1 may monitor at least one or multiple search spaces in slots in which Discontinuous reception (DRX) is not configured. The DRX may be given at least based on the higher layer parameter. The terminal apparatus 1 may monitor at least one or multiple search space sets (Search space sets) in slots in which the DRX is not configured.

The search space set may include at least one or multiple search spaces. The search space set may include at least some or all of the type 0 PDCCH common search spaces, the type 1 PDCCH common search spaces, and/or the UE-specific search spaces. The type 0 PDCCH common search space may be configured at least for monitoring some or all of uplink DCI formats and/or downlink DCI formats. The type 1 PDCCH common search space may be configured at least for monitoring some or all of the uplink DCI formats and/or the downlink DCI formats. The UE-specific search space may be configured at least for monitoring some or all of the uplink DCI formats and/or the downlink DCI formats.

The type 0 PDCCH common search space and the type 1 PDCCH common search space are also referred to as Common Search Spaces (CSSs). The UE individual search space is also be referred to as a UE-specific Search Space (USS).

Each of the search space sets may be associated with one control resource set. Each of the search space sets may be included at least in one control resource set. Each of the search space sets may be provided with the index of the control resource set associated with the search space set.

The type 0 PDCCH common search space may be used at least for the DCI format involving a Cyclic Redundancy Check (CRC) sequence scrambled with a System Information-Radio Network Temporary Identifier (SI-RNTI). The configuration of the control resource set associated at least with the type 0 PDCCH common search space may be given based at least on the higher layer parameter RMSI-PDCCH-Config. The higher layer parameter RMSI-PDCCH-Config may be included in the MIB. The higher layer parameter RMSI-PDCCH-Config may indicate at least one or both of the number of resource blocks included in a control resource set associated at least with the type 0 PDCCH common search space, and the number of OFDM symbols included in the control resource set. The higher layer parameter RMSI-PDCCH-Config may be indicated by an information field included in the MIB.

Type 1 PDCCH common search space may be used at least for the DCI format involving a CRC sequence scrambled with the Random Access-Radio Network Temporary Identifier (RA-RNTI), a CRC sequence scrambled with a Temporary Common-Radio Network Temporary Identifier (TC-RNTI), and/or a CRC sequence scrambled with a Common-Radio Network Temporary Identifier (C-RNTI). The RA-RNTI may be given based at least on the time/frequency resource for the random access preamble transmitted by the terminal apparatus 1. The TC-RNTI may be given by the PDSCH scheduled by the DCI format involving the CRC sequence scrambled with the RA-RNTI (the PDSCH is also referred to as a message 2 or a random access response grant). The C-RNTI may be given based at least on the PDSCH scheduled by the DCI format involving the CRC sequence scrambled with the TC-RNTI (the PDSCH is also referred to as a message 4 or contention resolution).

The UE-specific search space may be used at least for the DCI format involving the CRC sequence scrambled with the C-RNTI.

The common control resource set may include at least one or both of the CSS and the USS. The dedicated control resource set may include at least one or both of the CSS and the USS.

A physical resource of the search space includes a Control Channel Element (CCE) of the control channel. The CCE includes six Resource Element Groups (REGs). The REG may include one OFDM symbol in one Physical Resource Block (PRB). In other words, the REG may include 12 Resource Elements (REs). The PRB is also simply referred to as a Resource Block (RB).

The PDSCH is used at least to transmit the transport block. The PDSCH may be used at least to transmit a random access message 2 (random access response). The PDSCH may be at least used to transmit system information including parameters used for initial access.

In FIG. 1, the following downlink physical signals are used for the downlink radio communication. The downlink physical signals may not be used for transmitting information output from a higher layer, but is used by the physical layer.

Synchronization signal (SS)
DownLink DeModulation Reference Signal (DL DMRS)
Channel State Information-Reference Signal (CSI-RS)
DownLink Phase Tracking Reference Signal (DL PTRS)
Tracking Reference Signal (TRS)

The synchronization signal is used for the terminal apparatus 1 to establish synchronization in a frequency domain and/or a time domain in the downlink. The synchronization signal includes a Primary Synchronization Signal (PSS) and a Secondary Synchronization Signal (SSS).

An SS block (SS/PBCH block) is configured to include at least some or all of the PSS, the SSS, and the PBCH. Respective antenna ports of some or all of the PSS, SSS, and PBCH included in the SS block may be the same. Some or all of the PSS, SSS, and PBCH included in the SS block may be mapped to continuous OFDM symbols. Respective CP configurations of some or all of the PSS, SSS, and PBCH included in the SS block may be the same. Respective subcarrier spacing configurations $\mu$ of some or all of the PSS, SSS, and PBCH included in the SS block may be the same.

The DL DMRS is associated with transmission of the PBCH, PDCCH and/or PDSCH. The DL DMRS is multiplexed with the PBCH, PDCCH and/or PDSCH. The terminal apparatuses 1 may use the DL DMRS corresponding to the PBCH, PDCCH, or PDSCH in order to perform channel compensation of the PBCH, PDCCH or PDSCH. Hereinafter, transmission of both of the PBCH and the DL DMRS associated with the PBCH is referred to as transmission of the PBCH. Hereinafter, transmission of both of the PDCCH and the DL DMRS associated with the PDCCH is simply referred to as transmission of the PDCCH. Hereinafter, transmission of both of the PDSCH and the DL DMRS associated with the PDSCH is simply referred to as transmission of the PDSCH. The DL DMRS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH.

The CSI-RS may be a signal at least used to calculate channel state information. A pattern of the CSI-RS assumed by the terminal apparatus may be given by at least a higher layer parameter.

The PTRS may be a signal to be at least used to compensate for phase noise. A pattern of the PTRS assumed by the terminal apparatus may be given at least based on a higher layer parameter and/or DCI.

The DL PTRS may be associated with a DL DMRS group that includes at least an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of antenna ports for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

Downlink physical channels and downlink physical signals are collectively referred to as downlink signals. Uplink physical channels and uplink physical signals are collectively referred to as uplink signals. The downlink signals and the uplink physical signals are collectively referred to as physical signals. The downlink signal and the uplink signal are collectively referred to as signals. The downlink physical channels and the uplink physical channels are collectively referred to as physical channels. The downlink physical signals and the uplink physical signals are collectively referred to as physical signals.

The Broadcast CHannel (BCH), the UL-SCH (Uplink-Shared CHannel) and the DL-SCH (Downlink-Shared CHannel) are transport channels. A channel used in a Medium Access Control (MAC) layer is referred to as a transport channel A unit of the transport channel used in the MAC layer is also referred to as a transport block (TB) or an MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) higher layer signaling in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1.

A Broadcast Control CHannel (BCCH), a Common Control CHannel (CCCH), and a Dedicated Control CHannel (DCCH) are logical channels. For example, the BCCH is a higher layer channel used to transmit the MIB. Furthermore, the Common Control CHannel (CCCH) is a higher layer channel used to transmit information common to the multiple terminal apparatuses 1. Here, the CCCH may be used for a terminal apparatus 1 that is not in an RRC connected state, for example. Furthermore, the Dedicated Control CHannel (DCCH) is a higher layer channel at least used to transmit control information dedicated to the terminal apparatus 1 (dedicated control information). Here, the DCCH may be used for a terminal apparatus 1 that is in an RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

A configuration example of the terminal apparatus 1 according to the one aspect of the present embodiment will be described below.

Figure 5:
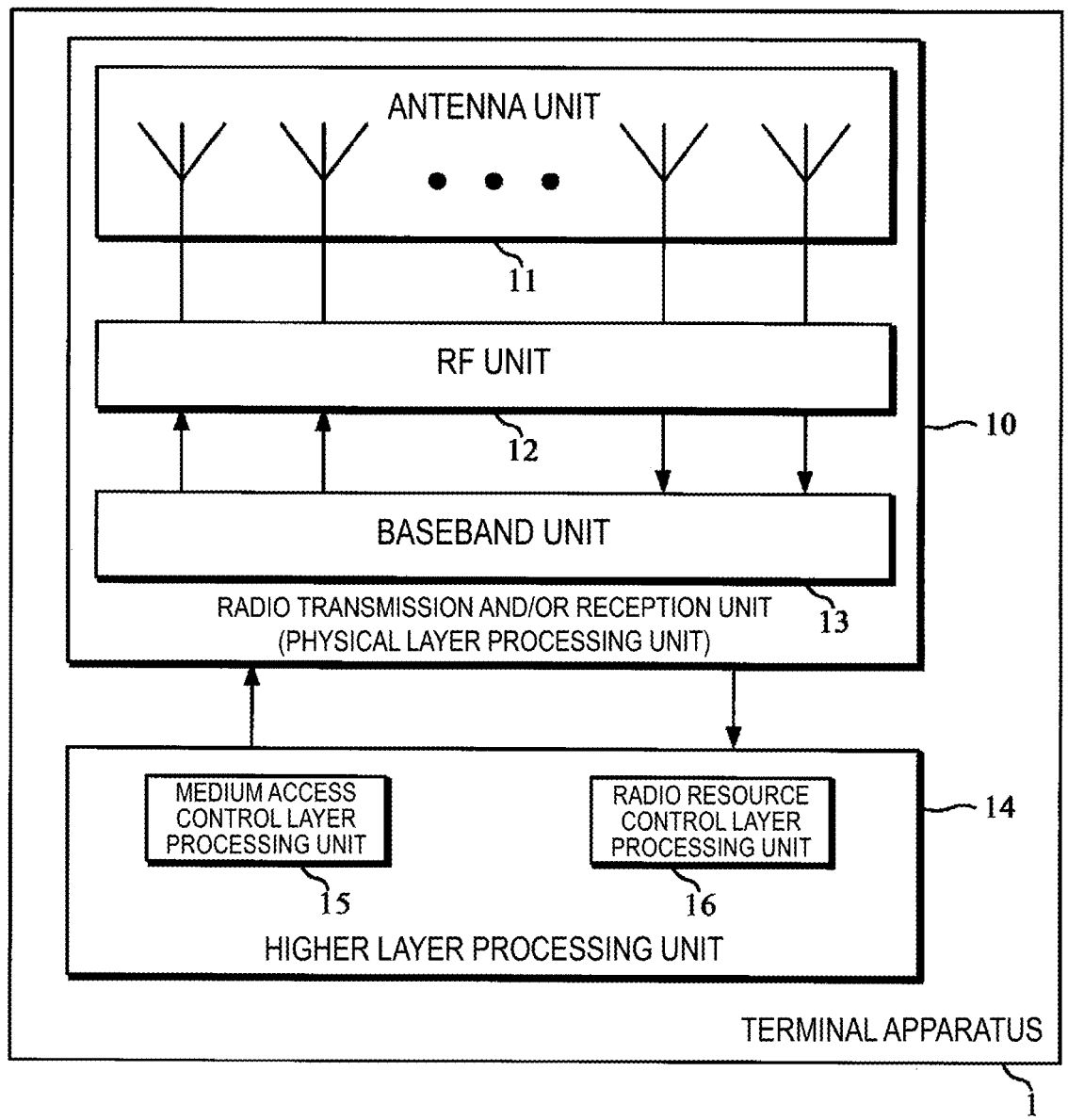
FIG. 5 is a schematic block diagram illustrating a configuration of a terminal apparatus 1 according to an aspect of the present embodiment.

FIG. 5 is a schematic block diagram illustrating a configuration of the terminal apparatus 1 according to an aspect of the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a Radio Frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of an MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The parameters may be higher layer parameters.

The radio transmission and/or reception unit 10 performs processing of the physical layer, such as modulation, demodulation, coding, decoding, and the like. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data, and generating a baseband signal (conversion into a time continuous signal), and transmits the physical signal to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 6:
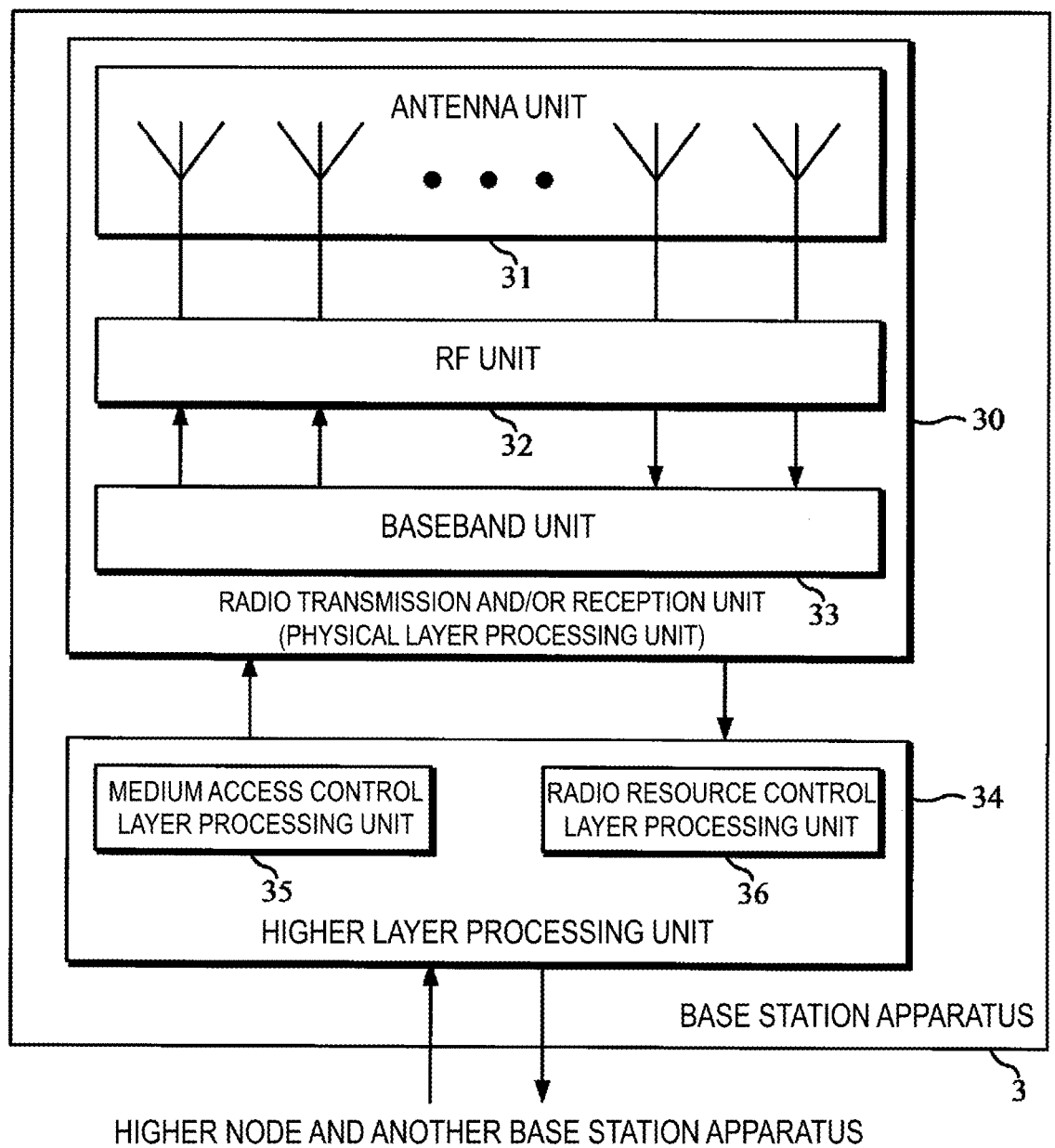
FIG. 6 is a schematic block diagram illustrating a configuration of a base station apparatus 3 according to an aspect of the present embodiment.

FIG. 6 is a schematic block diagram illustrating a configuration of the base station apparatus 3 according to an aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of an MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on a PDSCH, system information, an RRC message, an MAC CE, and the like, and outputs the data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Some or all of the units included in the terminal apparatus 1 and having reference signs 10 to 16 may be configured as a memory and a processor connected to the memory. Some or all of the units included in the base station apparatus 3 and having reference signs 30 to 36 may be configured as a memory and a processor connected to the memory. Various aspects (operations and processing) according to the present embodiment may be implemented (performed) in the memory included in the terminal apparatus 1 and/or the base station apparatus 3 and the processor connected to the memory.

Various examples of aspects will be described below.

In a case that no PUCCH resource configuration is provided by the dedicated RRC parameter, the PUCCH resource set may be configured by the SIB. The PUCCH resource set includes one or multiple PUCCH resources. In a case that the PUCCH resource configuration is given by the dedicated RRC parameter, the dedicated RRC parameter provides one or multiple PUCCH resource sets.

Figure 7:
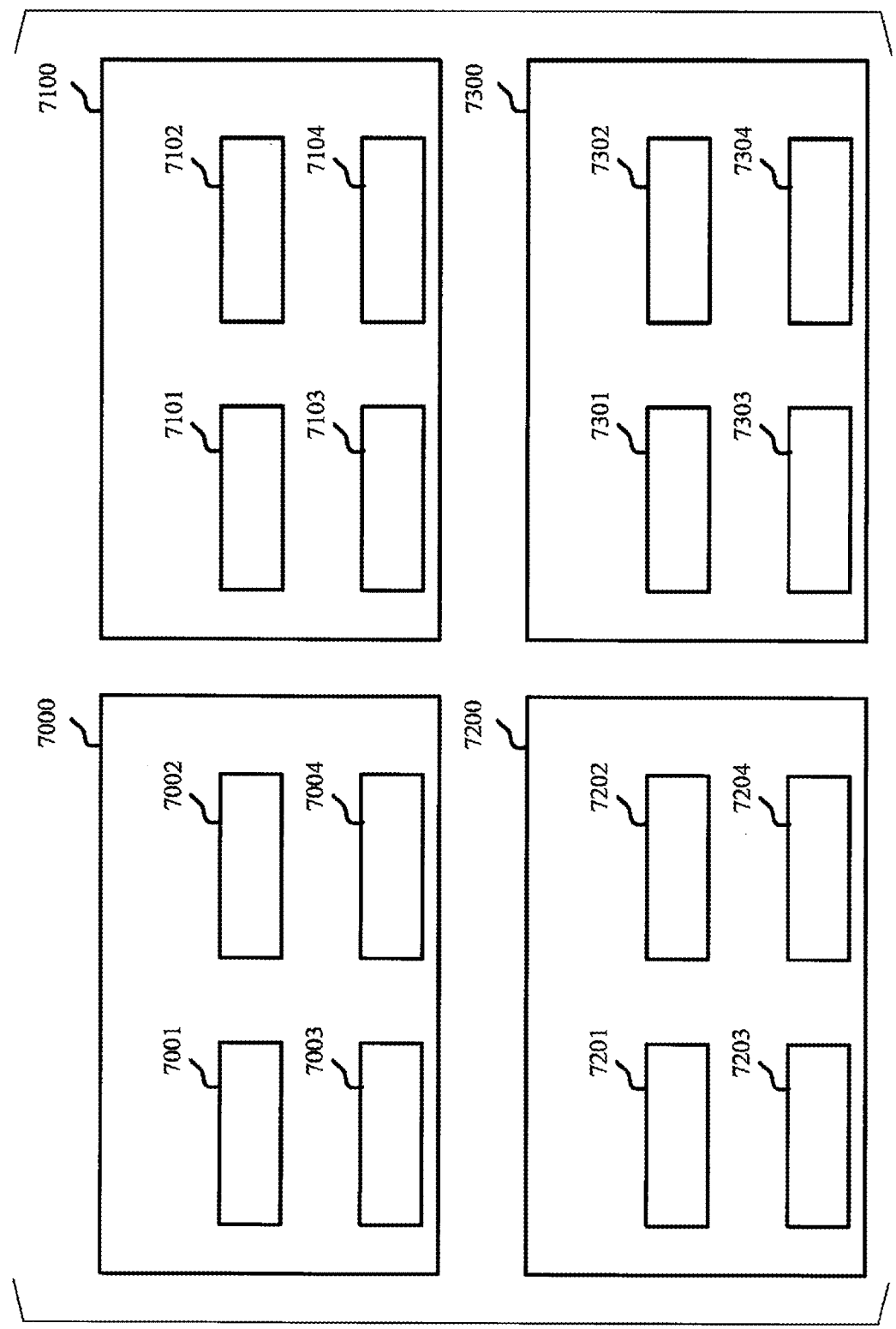
FIG. 7 is a diagram illustrating an example of a configuration of PUCCH resources according to an aspect of the present embodiment.

FIG. 7 is a diagram illustrating an example of a configuration of PUCCH resources according to an aspect of the present embodiment. In FIG. 7, the configuration of the PUCCH resources includes four PUCCH resource sets (PUCCH resource set 7000, PUCCH resource set 7100, PUCCH resource set 7200, PUCCH resource set 7300). Additionally, the PUCCH resource set 7000 includes four PUCCH resources (7001, 7002, 7003, 7004). In addition, the PUCCH resource set 7100 includes four PUCCH resources (7101, 7102, 7103, 7104). Additionally, the PUCCH resource set 7200 includes four PUCCH resources (7201, 7202, 7203, 7204). In addition, the PUCCH resource set 7300 includes four PUCCH resources (7301, 7302, 7303, 7304).

In a case that one PUCCH resource set is configured and $N_{UCI}$ bits of uplink control information including at least $O_{ACK}$ bits of HARQ-ACK information is transmitted, the one PUCCH resource set may be selected.

In a case that multiple PUCCH resource sets are configured and $N_{UCI}$ bits of uplink control information including at least $O_{ACK}$ bits of HARQ-ACK information is transmitted, one PUCCH resource set may be selected from the multiple PUCCH resource sets based at least on some or all of the following procedures P1 to P4.

In a case that, in procedure P1, $N_{UCI}$ is equal to or smaller than the value $N_1$ and that at least one SR configuration in one or more SR configurations indicates the positive SR and that the PUCCH resource corresponding to each of the one or multiple SR configurations collides with a PUCCH resource for an HARQ-ACK transmission, the PUCCH resource set 7000 may be selected. For example, $N_1$ may be 2. Additionally, $N_1$ may be 3. Additionally, $N_1$ may be given based at least on the number of SR configurations in the slot in which the HARQ-ACK information is at least transmitted. In addition, $N_1$ may be given based at least on the number of SR configurations for the terminal apparatus 1.

In a slot, a collision between a PUCCH resource A and a PUCCH resource B may indicate that at least one OFDM symbol of the OFDM symbols to which the PUCCH resource A is mapped is the same as one of the OFDM symbols to which the PUCCH resource B is mapped.

In a slot, a collision between the PUCCH resource A and the PUCCH resource B may indicate that the index of at least one OFDM symbol of the OFDM symbols to which the PUCCH resource A is mapped is the same as the index of at least one OFDM symbol of the OFDM symbols to which the PUCCH resource B is mapped.

In procedure P2, in a case that $N_{UCI}$ is larger than $N_1$ and equal to or smaller than $N_2$, the PUCCH resource set 7100 may be selected. $N_2$ may be given based at least on the higher layer parameter.

In procedure P3, in a case that $N_{UCI}$ is larger than $N_2$ and equal to or smaller than $N_3$, the PUCCH resource set 7200 may be selected. $N_3$ may be given based at least on the higher layer parameter.

In procedure P4, in a case that $N_{UCI}$ is larger than $N_3$ and equal to or smaller than $N_4$, the PUCCH resource set 7300 may be selected. $N_4$ may be 1706.

The PUCCH resource for transmission of the HARQ-ACK information in procedure P1 may be a PUCCH resource selected, based on a value in a PUCCH resource indication field, from a PUCCH resource set given based at least on $N_{UCI}$ being set to $O_{ACK}$.

Figure 8:
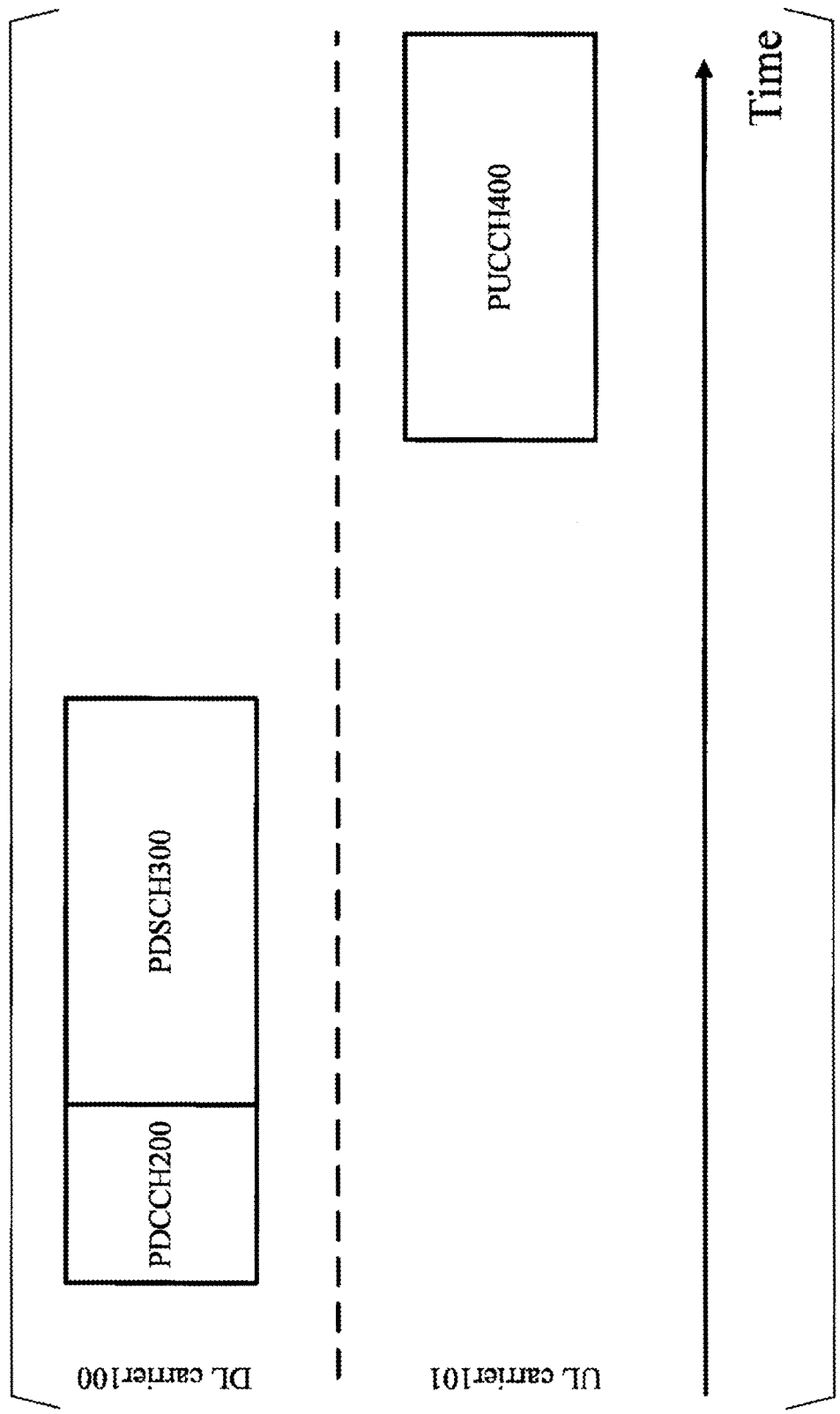
FIG. 8 is a diagram illustrating an example of reception of transport blocks and transmission of HARQ-ACK information corresponding to the transport block according to an aspect of the present embodiment.

FIG. 8 is a diagram illustrating an example of reception of transport blocks and transmission of HARQ-ACK information corresponding to the transport block according to an aspect of the present embodiment. The number of bits included in the HARQ-ACK information is $O_{ACK}$. In FIG. 8, a PDCCH 200 is transmitted on a downlink carrier (DL carrier) 100. A DCI format 201 included in the PDCCH 200 indicates the allocation of the frequency resource for a PDSCH 300 and/or the allocation of the time resource for the PDSCH 300. In FIG. 8, the PUCCH 400 transmitted in the uplink carrier (UL carrier) 101 is at least used for transmission of HARQ-ACK bits corresponding to transport blocks included in the PDSCH 300.

The PUCCH resource for the PUCCH 400 is given based at least on one PUCCH resource set selected from one or multiple PUCCH resource sets and the value in the PUCCH resource indication field included in the DCI format 201. The one PUCCH resource set may be given based at least on $N_{UCI}$ being set to $O_{ACK}$. The PUCCH resource may be one or multiple PUCCH resources included in the one PUCCH resource set and corresponding to the value in the PUCCH resource indication field. The PUCCH resource is identified based at least on some or all of the elements E1 to E6.

E1) Index of the PUCCH format of the PUCCH resource
E2) Index of a starting OFDM symbol of the PUCCH resource
E3) Number of OFDM symbols in the PUCCH resource
E4) Index of a starting resource block of the PUCCH resource
E5) Number of resource blocks in the PUCCH resource
E6) Index of the PUCCH resource The index of the PUCCH format may be used to indicate one of PUCCH format 0 to PUCCH format 4.

The index of the starting OFDM symbol of the PUCCH resource may be the index of the starting one of the OFDM symbols to which the PUCCH is mapped. The index of the starting one of the OFDM symbols to which the PUCCH is mapped may be the index of the starting one of the OFDM symbols to which the PUCCH is mapped in a certain slot.

The index of the starting one of the OFDM symbols for the PUCCH for one or both of PUCCH format 0 and/or PUCCH format 2 may be given based at least on the higher layer parameter PUCCH-F0-F2-starting-symbol. The index of the starting one of the OFDM symbols for the PUCCH for some or all of PUCCH format 1, PUCCH format 3, and/or PUCCH format 4 may be given based at least on the higher layer parameter PUCCH-F1-F3-F4-starting-symbol.

The number of OFDM symbols of the PUCCH resource for one or both of PUCCH format 0 and/or PUCCH format 2 may be given based at least on the higher layer parameter PUCCH-F0-F2-number-of-symbols. The higher layer parameter PUCCH-F0-F2-number-of-symbols may indicate 1 or 2. The number of OFDM symbols of the PUCCH resource for some or all of PUCCH format 1, PUCCH format 3, and/or PUCCH format 4 may be given based at least on the higher layer parameter PUCCH-F1-F3-F4-number-of-symbols. The higher layer parameter PUCCH-F1-F3-F4-number-of-symbols may indicate one of 4 to 14.

The number of resource blocks for the PUCCH may be the number of resource blocks to which the PUCCH is mapped. The number of resource blocks for the PUCCH may indicate the maximum number of resource blocks for the PUCCH. The maximum number of resource blocks for the PUCCH may be the maximum number of resource blocks to which the PUCCH is mapped.

The number of resource blocks in PUCCH format 2 may be given based at least on the higher layer parameter PUCCH-F2-number-of-PRBs. The number of resource blocks in PUCCH format 3 may be given based at least on the higher layer parameter PUCCH-F3-number-of-PRBs.

Figure 9:
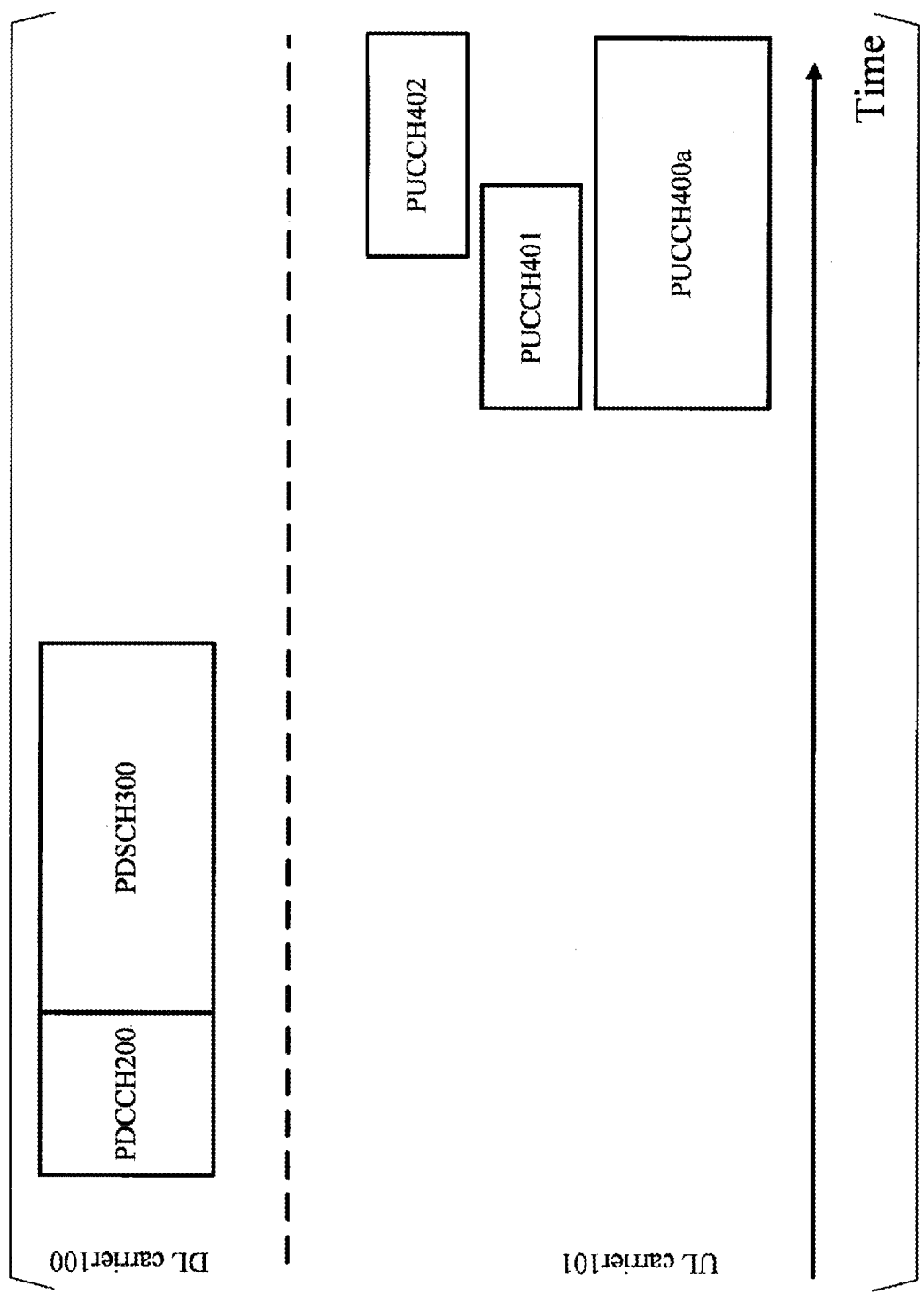
FIG. 9 is a diagram illustrating an example of reception of transport blocks and transmission of HARQ-ACK information corresponding to the transport block and an SR according to an aspect of the present embodiment.

FIG. 9 is a diagram illustrating an example of reception of transport blocks and transmission of HARQ-ACK information corresponding to the transport block and an SR according to an aspect of the present embodiment. The number of bits included in the HARQ-ACK information is $O_{ACK}$. In FIG. 9, the PDCCH 200 is transmitted on the downlink carrier (DL carrier) 100. The DCI format 201 included in the PDCCH 200 indicates the allocation of the frequency resource for the PDSCH 300 and/or the allocation of the time resource for the PDSCH 300. In FIG. 9, a PUCCH 400*a* transmitted in an uplink carrier (UL carrier) 101 is used at least for transmission of HARQ-ACK bits corresponding to transport blocks included in the PDSCH 300. A PUCCH 401 and a PUCCH 402 are PUCCH resources each corresponding to one SR configuration.

The PUCCH resource for the PUCCH 400*a* is given based at least on one PUCCH resource set selected from one or multiple PUCCH resource sets and the value in the PUCCH resource indication field included in the DCI format 201. The one PUCCH resource set may be given based at least on $N_{UCI}$ being set to $O_{ACK}$ The one PUCCH resource set may be given based at least on $N_{UCI}$ being set to $O_{ACK}+O_{SR}$. The PUCCH resource may be one or multiple PUCCH resources included in the one PUCCH resource set and corresponding to the value in the PUCCH resource indication field.

$O_{SR}$ may be given based at least on the number K of SR configurations. The number K of SR configurations may be the number of SR configurations corresponding to the PUCCH resource configured in the slot in which the PUCCH 400a is transmitted. The number K of SR configurations may be the number of SR configurations corresponding to the PUCCH resource that collides with the PUCCH 400a. The number K of SR configurations may be the number of SR configurations for the terminal apparatus 1.

Figure 10:
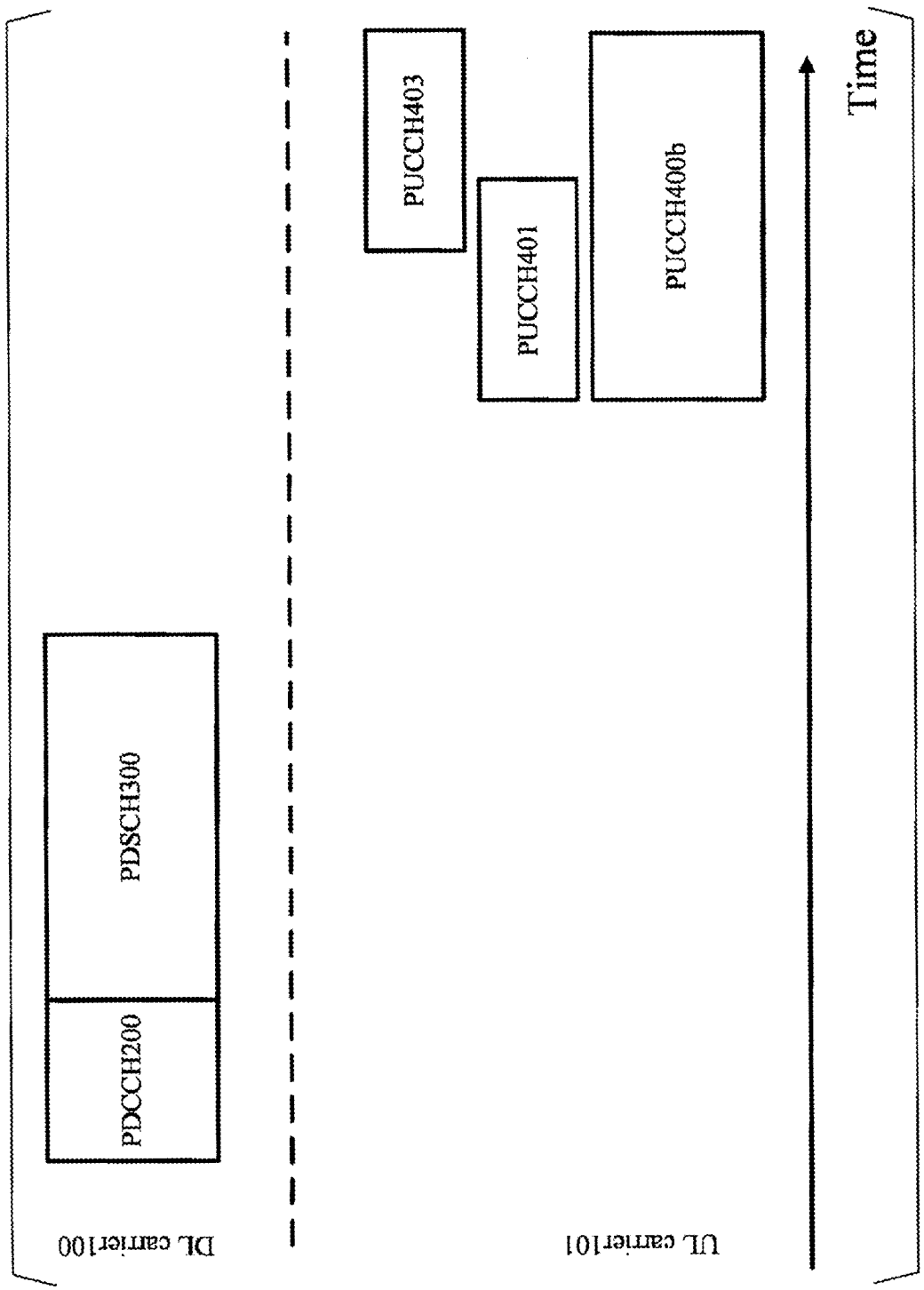
FIG. 10 is a diagram illustrating an example of reception of transport blocks and transmission of HARQ-ACK information corresponding to the transport blocks, an SR, and a channel state information report according to an aspect of the present embodiment.

FIG. 10 is a diagram illustrating an example of reception of transport blocks and transmission of HARQ-ACK information corresponding to the transport blocks, an SR, and a channel state information report according to an aspect of the present embodiment. The number of bits included in the HARQ-ACK information is $O_{ACK}$ In FIG. 10, the PDCCH 200 is transmitted on the downlink carrier (DL carrier) 100. The DCI format 201 included in the PDCCH 200 indicates the allocation of the frequency resource for the PDSCH 300 and/or the allocation of the time resource for the PDSCH 300. In FIG. 10, a PUCCH 400b transmitted in the uplink carrier (UL carrier) 101 is used at least for transmission of HARQ-ACK bits corresponding to transport blocks included in the PDSCH 300. The PUCCH 401 is a PUCCH resource corresponding to one SR configuration. The PUCCH 403 is a PUCCH resource configured for $O_{CSI}$ bits of channel state information report.

The PUCCH resource for the PUCCH 400b is given based at least on one PUCCH resource set selected from one or multiple PUCCH resource sets and the value in the PUCCH resource indication field included in the DCI format 201. The one PUCCH resource set may be given based at least on $N_{UCI}$ being set to $O_{ACK}+O_{SR}+O_{CSI}$ The PUCCH resource may be one or multiple PUCCH resources included in the one PUCCH resource set and corresponding to the value in the PUCCH resource indication field.

The PUCCH 403 may be configured for the index of one channel state information report (CSI report). The PUCCH 403 may be configured for the indexes of multiple channel state information reports.

Figure 11:
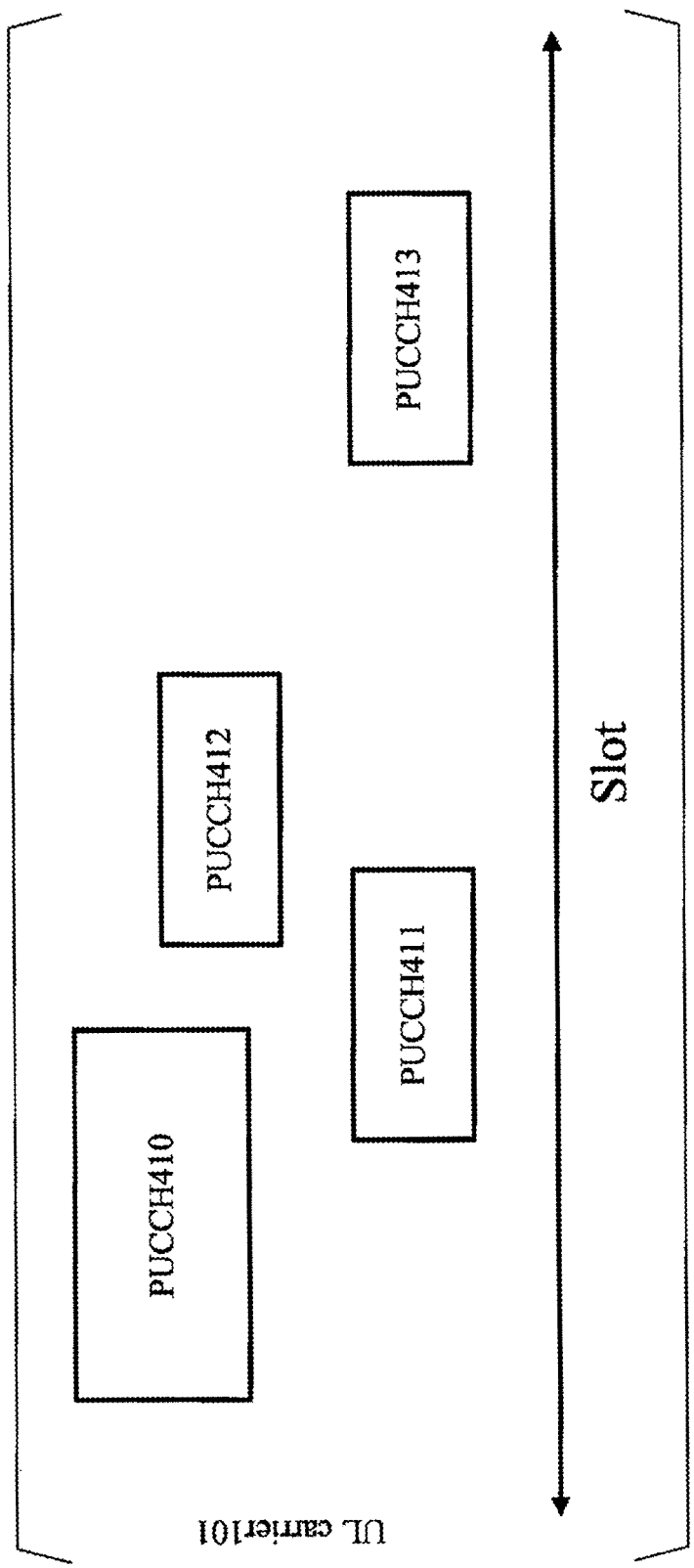
FIG. 11 is an example of multiplexing of multiple channel state information reports according to an aspect of the present embodiment.

FIG. 11 is an example of multiplexing of multiple channel state information reports according to an aspect of an embodiment of the present invention. In FIG. 11, a PUCCH 410, a PUCCH 411, a PUCCH 412, and a PUCCH 413 are configured in a certain slot. Here, the PUCCH 410, the PUCCH 411, the PUCCH 412, and the PUCCH 413 are configured for a channel state information report 420, a channel state information report 421, a channel state information report 422, and a channel state information report 423, respectively. A PUCCH may be selected that is configured for one or two channel state information reports of the channel state information report 420, the channel state information report 421, the channel state information report 422, and the channel state information report 423, the one or two channel state information reports having the highest priority. In a case that two channel state information reports having the highest priority are selected, either one of the two PUCCHs corresponding to the two channel state information reports is at least in PUCCH format 2. Additionally, in a case that two channel state information reports having the highest priority are selected, the two PUCCHs corresponding to the two channel state information reports are prevented from colliding with each other.

In a case that, in a certain slot, multiple PUCCH resources corresponding to the indexes of multiple channel state information reports are configured, one or two PUCCH resources may be selected based at least on the priority for each of the multiple channel state information reports. In a case that two PUCCH resources are selected, either one of the two PUCCH resources is in PUCCH format 2. Additionally, in a case that two PUCCH resources are selected, the two PUCCH resources are prevented from colliding with each other.

Additionally, the channel state information report 420, the channel state information reports 421, the channel state information reports 422, and the channel state information reports 423 may be multiplexed on the PUCCH 403.

In a certain slot, in a case that multiple PUCCH resources corresponding to the indexes of multiple channel state information reports are configured and any two PUCCH resources of the multiple PUCCH resources at least collide with each other, the multiple channel state information reports may be multiplexed on the PUCCH 403. In a case that, in a certain slot, multiple PUCCH resources corresponding to the indexes of multiple channel state information reports are configured, the multiple channel state information reports may be multiplexed on the PUCCH 403. Whether the multiple channel state information reports are multiplexed on the PUCCH 403 or not may be given based at least on the higher layer parameter Multi-CSI-PUCCH-ResourceList. The higher layer parameter Multi-CSI-PUCCH-ResourceList may include one or two PUCCH resources. In a case that the multiple channel state information reports are multiplexed on the PUCCH 403, the PUCCH resource for the PUCCH 403 may be provided from the PUCCH resources included in the higher layer parameter Multi-CSI-PUCCH-ResourceList.

Figure 12:
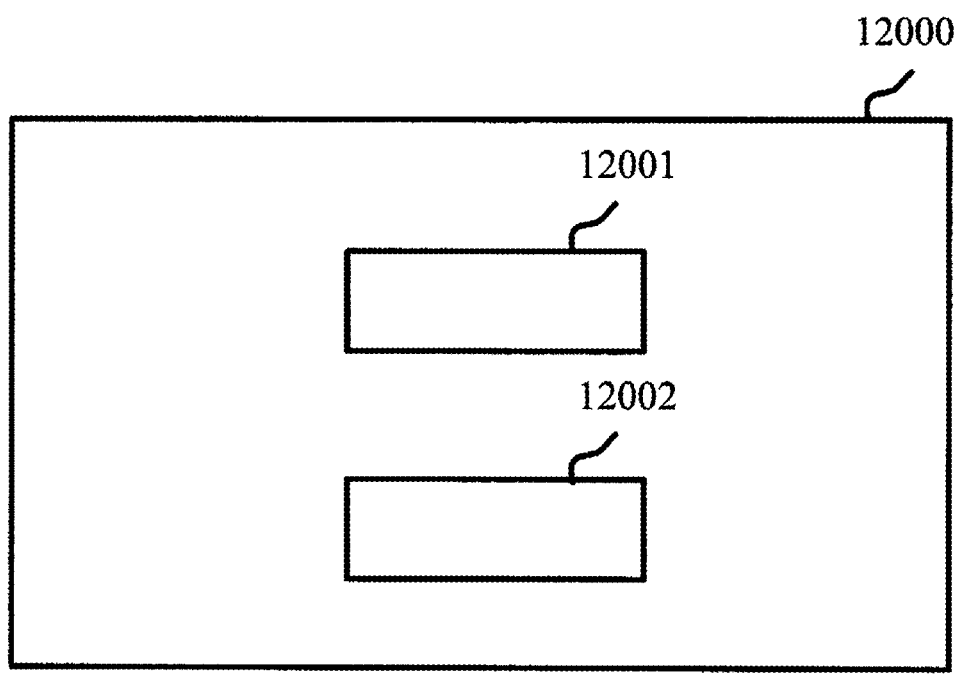
FIG. 12 is a diagram illustrating an example of a configuration of a PUCCH resource included in a higher layer parameter Multi-CSI-PUCCH-ResourceList according to an aspect of the present embodiment.

FIG. 12 is a diagram illustrating an example of configuration of a PUCCH resource included in the higher layer parameter Multi-CSI-PUCCH-ResourceList according to an aspect of the present embodiment. In FIG. 12, a PUCCH resource set 12000 includes a PUCCH resource 12001 and a PUCCH resource 12002. The PUCCH resource 12001 and the PUCCH resource 12002 are configured by higher layer parameters Multi-CSI-PUCCH-ResourceList.

In a case that the number $O_{CSI}$ of bits in $N_{total}$ channel state information reports satisfies Expression (1), the PUCCH resource 12001 may be given as a PUCCH resource for the PUCCH 403. $O_{CSI}$ may be given based on Expression (2). In other words, the PUCCH resource for the PUCCH 403 may be given based at least on some or all of $O_{CSI}$, $O_{CRC}$, $M^{PUCCH}_{RB,0}$, $N^{RB}_{sc,ctrl}$, $N^{PUCCH}_{symb-UCI,0}$, $Q_m$, and r. $N_{total}$ channel state information reports are referred to as N channel state information reports.

$$(O_{CSI} + O_{CRC}) \leq M^{PUCCH}_{RB,0} \cdot N^{RB}_{sc,ctrl} \cdot N^{PUCCH}_{symb-UCI,0} \cdot Q_m \cdot r \quad \text{[Expression 1]}$$

$$O_{CSI} = \sum_{n=1}^{N_{total}} O_{CSI,n} \quad \text{[Expression 2]}$$

$N_{total}$ channel state information reports may correspond to the number of channel state information reports configured for reporting on the PUCCH in a certain slot.

$O_{CRC}$ may be the number of CRC bits corresponding to $O_{CSI}$. The number of CRC bits corresponding to $O_{CSI}$ may be the number of CRC bits given assuming that $O_{CSI}$ bits of uplink control information are to be transmitted. In other words, the number of CRC bits corresponding to a prescribed number of bits may be the number of CRC bits given assuming that the prescribed number of bits of uplink control information are to be transmitted. Additionally, $M^{PUCCH}_{RB0}$ may be the number of resource blocks of the PUCCH resource 12001. In addition, in a case that the PUCCH 403 is in PUCCH format 2, $N^{RB}_{sc,ctrl}$ may be $N^{RB}_{sc}-4$. Additionally, in a case that the PUCCH 403 is in PUCCH format 3 or PUCCH format 4, $N^{RB}_{sc,ctrl}$ may be $N^{RB}_{sc}$. In addition, $N^{RB}_{sc,ctrl}$ may correspond to the number of resource elements for uplink control information used per OFDM symbol in the PUCCH format. Additionally, in a case that the PUCCH resource 12001 is in PUCCH format 2, $N^{RB}_{symb-ICI0}$ may be the number of OFDM symbols of the PUCCH resource 12001. In addition, in a case that the PUCCH resource 12001 is in PUCCH format 3 or PUCCH format 4, $N^{RB}_{symb-ICI0}$ may be a value obtained by subtracting the number of OFDM symbols used for DMRSs associated with the PUCCH resource 12001 from the number of OFDM symbols of the PUCCH resource 12001. $Q_m$ may correspond to a modulation order of a modulation scheme used for the PUCCH 403. For example, the modulation order of the QPSK modulation scheme is 2. r may be a value corresponding to a coding rate given by the higher layer parameter. $O_{CSI,n}$ may be the number of bits in an n-th channel state information report. $O_{CSI,n}$ may be the number of bits in one of $N_{total}$ channel state information reports that has the n-th highest priority. In a case that the n-th channel state information report includes a CSI part 1 and a CSI part 2, the number of bits may be given by using $O_{CSI,n} = O_{CSI1,n} + O_{CSI2,n}$. Here, $O_{CSI1,n}$ is the number of bits in the CSI part 1 included in the n-th channel state information report. Additionally, $O_{CSI2,n}$ is the number of bits in the CSI part 2 included in the n-th channel state information report.

The n-th channel state information report may indicate one of the $N_{total}$ channel state information reports that has the n-th highest priority.

The number $O_{CSI}$ of bits in the $N_{total}$ channel state information reports not satisfying Expression (1) may mean the number $O_{CSI}$ of bits in the $N_{total}$ channel state information reports satisfying Expression (3).

$$(O_{CSI}+O_{CRC})>M^{PUCCH}_{RB,0} \cdot N^{RB}_{sc,ctrl} \cdot N^{PUCCH}_{symb-UCI,0} \cdot Q_m \cdot r \quad \text{[Expression 3]}$$

In a case that the number $O_{CSI}$ of bits in the $N_{total}$ channel state information reports does not satisfy Expression (1) and satisfies Expression (4), the PUCCH resource 12002 may be given as a PUCCH resource for the PUCCH 403. In other words, the PUCCH resource for the PUCCH 403 may be given based at least on some or all of $O_{CSI}$, $O_{CRC}$, $N^{RB}_{sc,ctrl}$, $N^{PUCCH}_{symb-UCH}$, $Q_m$, and r.

$$(O_{CSI}+O_{CRC}) \leq M^{PUCCH}_{RB,1} \cdot N^{RB}_{sc,ctrl} \cdot N^{PUCCH}_{symb-UCI,0} \cdot Q_m \cdot r \quad \text{[Expression 4]}$$

Here, $M^{PUCCH}_{RB1}$ may be the number of resource blocks of the PUCCH resource 12002. Additionally, in a case that the PUCCH resource 12002 is in PUCCH format 2, $N^{PUCCH}_{symb-UCI1}$ may be the number of OFDM symbols of the PUCCH resource 12002. In addition, in a case that the PUCCH resource 12002 is in PUCCH format 3 or PUCCH format 4, $N^{PUCCH}_{symb-UCI1}$ may be a value obtained by subtracting the number of OFDM symbols used for DMRSs associated with the PUCCH resource 12002 from the number of OFDM symbols of the PUCCH resource 12002.

In a case that the number $O_{CSI}$ of bits in the $N_{total}$ channel state information reports does not satisfy Expression (1) and does not satisfy Expression (4), the PUCCH resource 12002 may be given as a PUCCH resource for the PUCCH 403.

In a case that the number $O_{CSI}$ of bits in the $N_{total}$ channel state information reports does not satisfy Expression (1) and does not satisfy Expression (4), then of the $N_{total}$ channel state information reports, $N^{selected}_{CSI}$ channel state information reports having the highest priority may be multiplexed on the PUCCH 403.

$N^{selected}_{CSI}$ may be given based at least on Expression (5) and Expression (6). In other words, $N^{selected}_{CSI}$ may be given based at least on some or all of $O_{CSI,N}$, $O_{CRC,N}$, $M^{PUCCH}_{RB1}$, $N^{RB}_{sc,ctrl}$, $N^{PUCCH}_{symb-UCI1}$, $Q_m$, r, $O_{CSI,N+1}$, and $O_{CRC,N+1}$.

$$(O_{CSI,N}+O_{CRC,N}) \leq M^{PUCCH}_{RB,1} \cdot N^{RB}_{sc,ctrl} \cdot N^{PUCCH}_{symb-UCI,1} \cdot Q_m \cdot r \quad \text{[Expression 5]}$$

$$(O_{CSI,N+1}+O_{CRC,N+1}) > M^{PUCCH}_{RB,1} \cdot N^{RB}_{sc,ctrl} \cdot N^{PUCCH}_{symb-UCI,1} \cdot Q_m \cdot r \quad \text{[Expression 6]}$$

$O_{CSI,N}$ may be the number of bits may be the number of bits in $N^{selected}_{CSI}$ channel state information reports included in the $N_{total}$ channel state information reports and having the highest priority. Additionally, $O_{CSI,N}$ may be given based at least on Expression (7).

$$O_{CSI,N+1} = \sum_{n=1}^{N^{selected}_{CSI}} O_{CSI,n} \quad \text{[Expression 7]}$$

Here, $O_{CSI,N}$ may be the number of bits in the $N^{selected}_{CSI}$ channel state information reports multiplexed on the PUCCH 403. Additionally, $O_{CSI,N}$ may be given based at least on the value of the rank indicator set in each of the $N^{selected}_{CSI}$ channel state information reports. In addition, $O_{CRC,N}$ may be the number of CRC bits corresponding to $O_{CSI,N}$. Additionally, $O_{CSI,N+1}$ may be the number of bits in $N^{selected}_{CSI}+1$ channel state information reports included in the $N_{total}$ channel state information reports and having the highest priority. In addition, $O_{CSI,N+1}$ may be given based at least on Expression 8.

$$O_{CSI,N+1} = \sum_{n=1}^{N^{selected}_{CSI}+1} O_{CSI,n} \quad \text{[Expression 8]}$$

Here, $O_{CRC,N+1}$ may be the number of CRC bits corresponding to $O_{CSI,N+1}$.

In a case that at least any one of the $N_{total}$ channel state information reports includes the CSI part 1 and the CSI part 2, the number $O_{CSI}$ of bits in the n-th channel state information report is unknown to the base station apparatus 3, and thus an value $N^{selected}_{CSI}$ selected by the terminal apparatus 1 is unknown, and the base station apparatus 3 needs to blindly detect $O_{CSI,N}$.

For example, in a case that at least one of the $N_{total}$ channel state information reports includes at least the CSI part 2, the $N^{selected}_{CSI}$ may be given based on the assumption that the rank indicator of the at least one channel state information report is set to a prescribed value. Additionally, based on the assumption that the rank indicator in the n-th of the $N_{total}$ channel state information reports is set to a prescribed value, $N^{selected}_{CSI}$ may be given.

The rank indicator in the channel state information report being set to the prescribed value may mean that the rank indicator in the channel state information report being set to 1. The rank indicator in the channel state information report being set to the prescribed value may mean that the rank indicator in the channel state information report being set to a maximum value. The maximum value may be the maximum value of a set of rank indicators permitted based at least on the higher layer parameter RankRestriction associated with the channel state information report.

For example, in a case that at least one of the $N_{total}$ channel state information reports includes at least the CSI part 2, the value $N^{selected}_{CSI}$ may be given based at least on some or all of Expression (5), Expression (6), Expression (9), and Expression (10). In other words, $N^{selected}_{CSI}$ may be given based at least on some or all of $O_{CSI,N\_ref}$, $O_{CRC,N}$, $M^{PUCCH}_{RB1}$, $N^{RB}_{sc,ctrl}$, $N^{PUCCH}_{symb-UCI1}$, $Q_m$, $r$, $O_{CSI,N+1}$, $O_{CRC,N+1\_ref}$, and $O_{CSI2,n,ref}$.

$$O_{CSI,N\_ref} = \sum_{n=1}^{N^{selected}_{CSI}} O_{CSI1,n} + \sum_{n=1}^{N^{selected}_{CSI}} O_{CSI2,n,ref} \quad \text{[Expression 9]}$$

$$O_{CSI,N+1\_ref} = \sum_{n=1}^{N^{selected}_{CSI}+1} O_{CSI1,n} + \sum_{n=1}^{N^{selected}_{CSI}+1} O_{CSI2,n,ref} \quad \text{[Expression 10]}$$

Here, $O_{CSI,N\_ref}$ may be the number of bits in $N^{selected}_{CSI}$ channel state information reports given based on the assumption that the rank indicator in each of the $N^{selected}_{CSI}$ channel state information reports is set to a prescribed value. Additionally, $O_{CSI,N+1\_ref}$ may be the number of bits in $N^{selected}_{CSI}+1$ channel state information reports given based on the assumption that the rank indicator in each of the $N^{selected}_{CSI}+1$ channel state information reports is set to a prescribed value. Additionally, $O_{CSI2,n,ref}$ is the number of bits in the CSI part 2 of the n-th channel state information report given based at least on the assumption that the rank indicator in the n-th channel state information report is set to a prescribed value.

The PUCCH resource for the PUCCH 400*b* is given based at least on one PUCCH resource set selected from one or multiple PUCCH resource sets and the value in the PUCCH resource indication field included in the DCI format 201. The one PUCCH resource set may be given based at least on $N_{UCI}$ being set to $O_{ACK}+O_{SR}+O_{CSI,ref\_rank1}$. The PUCCH resource may be one or multiple PUCCH resources included in the one PUCCH resource set and corresponding to the value in the PUCCH resource indication field.

$O_{CSI,ref\_rank1}$ may be the number of bits in $N^{selected}_{CSI}$ channel state information reports multiplexed on the PUCCH 403, the number being given based on the assumption that the rank indicator in each of the $N^{selected}_{CSI}$ channel state information reports is set to 1.

In a case that the value $N^{selected}_{CSI}$ is given based on the number $O_{CSI}$ of bits in the $N_{total}$ channel state information reports, the base station apparatus 3 may need to decode the PUCCH 403 with the value $N^{selected}_{CSI}$ unknown.

For example, $O_{CSI,ref\_rank1}$ may be the number of bits in the $N_{total}$ channel state information reports given based on the assumption that the rank indicator in each of the $N_{total}$ channel state information report is set to 1.

$O_{CSI,ref\_rank1}$ may be given based on Expression (11) or Expression (12). In other words, $O_{CSI,ref\_rank1}$ may be given based at least on some or all of $N_{total}$, $O_{CSI1,n}$, $N^{selected}_{CSI}$, and $O_{CSI2,n,ref\_rank1}$.

$$O_{CSI,ref\_rank1} = \sum_{n=1}^{N_{total}} O_{CSI1,n} + \sum_{n=1}^{N_{total}} O_{CSI2,n,ref\_rank1} \quad \text{[Expression 11]}$$

$$O_{CSI,ref\_rank1} = \sum_{n=1}^{N^{selected}_{CSI}} O_{CSI1,n} + \sum_{n=1}^{N^{selected}_{CSI}} O_{CSI2,n,ref\_rank1} \quad \text{[Expression 12]}$$

Here, $O_{CSI2,n,ref\_rank1}$ is the number of bits in the CSI part 2 included in the n-th channel state information report, the CSI part 2 being given based on the assumption that the rank indicator in the n-th channel state information report is set to 1.

In a case that the number $O_{CSI}$ of bits in the $N_{total}$ channel state information reports does not satisfy Expression (1) and does not satisfy Expression (4), then of the $N_{total}$ channel state information reports, $N^{selected}_{CSI-part2}$ channel state information reports having the highest priority may be multiplexed on the PUCCH 403.

$N^{selected}_{CSI-part2}$ may be given based on Expression (13) and Expression (14). $N^{selected}_{CSI-part2}$ may be given based at least on some or all of $O_{CSI-part2,N}$, $O_{CRC,CSI-part2,N}$, $M^{PUCCH}_{RB1}$, $N^{RB}_{sc,ctrl}$, $N^{PUCCH}_{symb-UCI1}$, $O_{CSI-part1,n}$, $O_{CRC,CSI-part1}$, $Q_m$, $r$, $O_{CSI-part2,N+1}$, and $O_{CRC,CSI-part2,N+1}$.

$$O_{CSI-part2,N} + \quad \text{[Expression 13]}$$
$$O_{CRC,CSI-part2,N} \leq \left[ M^{PUCCH}_{RB1} \cdot N^{RB}_{sc,ctrl} \cdot N^{PUCCH}_{symb-UCI1} - \right.$$
$$\left. \text{ceil}\left(\left(\sum_{n=1}^{N_{total}} O_{CSI-part1,n} + O_{CRC,CSI-part1}\right) \Big/ (Q_m \cdot r)\right) \right] Q_m \cdot r$$

$$O_{CSI-part2,N+1} + \quad \text{[Expression 14]}$$
$$O_{CRC,CSI-part2,N+1} > \left[ M^{PUCCH}_{RB} \cdot N^{RB}_{sc,ctrl} \cdot N^{PUCCH}_{symb-UCI} - \right.$$
$$\left. \text{ceil}\left(\left(O_{ACK} + O_{SR} + \sum_{n=1}^{N_{total}} O_{CSI-part1,n} + O_{CRC,CSI-part1}\right) \Big/ (Q_m \cdot r)\right) \right] Q_m \cdot r$$

Here, $O_{CSI-part2,N}$ may be the number of bits in the $N^{selected}_{CSI-part2}$ CSI parts 2 included in the $N_{total}$ channel state information reports and having the highest priority. Additionally, $O_{CSI-part2,N}$ may be given based on Expression (15).

$$O_{CSI-part2,N} = \sum_{n=1}^{N^{selected}_{CSI-part2}} O_{CSI-part2,n} \quad \text{[Expression 15]}$$

Here, $O_{CSI-part2,N}$ may be the number of bits in the $N^{selected}_{CSI-part2}$ CSI parts 2 multiplexed on the PUCCH 403. Additionally, $O_{CSI-part2,N}$ may be given based at least on the value of the rank indicator set in each of the $N^{selected}_{CSI-part2}$ channel state information reports. In addition, $O_{CSI-part2,n}$ is the number of bits in the CSI part 2 included in the n-th channel state information report.

Additionally, $O_{CRC,CSI-part2,N}$ indicates CRC bits corresponding to $O_{CSI-part2,N}$. In addition, $O_{CSI-part1,n}$ is the number of bits in the CSI part 1 included in the n-th channel state information report. Additionally, $O_{CRC,CSI-part1}$ is the number of CRC bits corresponding to the number $O_{CSI-part1,N}$ of bits in the CSI parts 1 included in the $N_{total}$ channel state information reports.

Additionally, $O_{CSI-part2,N+1}$ may be the number of bits in the $N^{selected}_{CSI-part2}+1$ CSI parts 2 included in the $N_{total}$ channel state information reports and having the highest priority. In addition, $O_{CSI-part2,N+1}$ may be given based on Expression (16).

$$O_{CSI-part2,N+1} = \sum_{n=1}^{N^{selected}_{CSI-part2}+1} O_{CSI-part2,n} \quad \text{[Expression 16]}$$

Additionally, $O_{CRC,CSI-part2,N+1}$ is the number of CRC bits corresponding to $O_{CSI-part2,N+1}$.

ceil (A) may be a ceiling function of A. Additionally, ceil (A) may be a function providing a minimum integer within the range in which the integer is not smaller than A.

In determination of $N^{selected}_{CSI-part2}$, $O_{CSI-part2,N\_ref}$ may be given based at least on the assumption that the rank indicator in the n-th channel state information report is set to a prescribed value. For example, in determination of $N^{selected}_{CSI-part2}$, $O_{CSI-part2,N\_ref}$ may be given based on Expression (17).

$$O_{CSI-part2,N\_ref} = \sum_{n=1}^{N^{selected}_{CSI-part2}} O_{CSI-part2,n,ref} \quad \text{[Expression 17]}$$

Additionally, $O_{CSI-part2,N\_ref}$ may be the number of bits in $N^{selected}_{CSI-part2}$ channel state information reports given based at least on the assumption that the rank indicator in each of the $N^{selected}_{CSI-part2}$ channel state information reports is set to a prescribed value. In addition, in determination of $N^{selected}_{CSI-part2}$, $O_{CSI-part2,N+1}$ may be given based at least on the assumption that the rank indicator in the n-th channel state information reports is set to a prescribed value. For example, in determination of $N^{selected}_{CSI-part2}$, $O_{CSI-part2,N+1}$ may be given based on Expression (18).

$$O_{CSI-part2,1\_ref} = \sum_{n=1}^{N^{selected}_{CSI-part2}+1} O_{CSI-part2,n,ref} \quad \text{[Expression 18]}$$

Here, $O_{CSI-part2,N+1\_ref}$ may be the number of bits in the CSI parts 2 included in $N^{selected}_{CSI-part2}+1$ channel state information reports, the CSI parts 2 being given based at least on the assumption that the rank indicator in each of the $N^{selected}_{CSI-part2}+1$ channel state information reports is set to a prescribed value.

In a case that the PUCCH resource for the PUCCH 400b is in PUCCH format 3 or PUCCH format 4 and at least satisfies Expression (19), uplink control information including at least the $N_{total}$ channel state information reports may be multiplexed on the PUCCH 400b. The number $M_{PUCCH,RB,min}$ of resource blocks of the PUCCH resource may satisfy Expression (20) and Expression (21). In other words, whether to multiplex, on the PUCCH 400b, the uplink control information including at least the $N_{total}$ channel state information reports may be given based at least on some or all of $O_{ACK}$, $O_{SR}$, $O_{CSI,ref\_rank1}$, $O_{CRC,Mmax}$, $M^{PUCCH}_{RB}$, $N^{RB}_{sc,ctrl}$, $N^{PUCCH}_{symb-UCI}$, $Q_m$, and r. Additionally, the number $M_{PUCCH,RB,min}$ of resource blocks of the PUCCH resource may be given based at least on some or all of $O_{ACK}$, $O_{SR}$, $O_{CSI,ref\_rank1}$, $O_{CRC,M}$, $N^{RB}_{sc,ctrl}$, $N^{PUCCH}_{symb-UCI}$, $Q_m$, r, and $O_{CRC,M-1}$.

$$\frac{(O_{ACK}+O_{SR}+O_{CSI,ref\_rank1}+O_{CRC,Mmax})}{N^{PUCCH}_{symb-UCI} \cdot Q_m \cdot r} \leq M^{PUCCH}_{RB} \cdot N^{RB}_{sc,ctrl} \quad \text{[Expression 19]}$$

$$\frac{(O_{ACK}+O_{SR}+O_{CSI,ref\_rank1}+O_{CRC,M})}{N^{PUCCH}_{symb-UCI} \cdot Q_m \cdot r} \leq M^{PUCCH}_{RB,min} \cdot N^{RB}_{sc,ctrl} \quad \text{[Expression 20]}$$

$$\frac{(O_{ACK}+O_{SR}+O_{CSI,ref\_rank1}+O_{CRC,M-1})}{N^{PUCCH}_{symb-UCI} \cdot Q_m \cdot r} > (M^{PUCCH}_{RB,min}-1) \cdot N^{RB}_{sc,ctrl} \quad \text{[Expression 21]}$$

Here, $O_{CRC,Mmax}$ is the number of CRC bits corresponding to the number $M^{PUCCH}_{RB}$ of resource blocks of the PUCCH resource for the PUCCH 400b. The number $M^{PUCCH}_{RB}$ of the resource blocks may be given based on the higher layer parameter. In a case that the PUCCH resource for the PUCCH 400b is in PUCCH format 2, $N^{PUCCH}_{symb-UCI}$ may be the number of OFDM symbols of the PUCCH resource for the PUCCH 400b. In addition, in a case that the PUCCH resource for the PUCCH 400b is in PUCCH format 3 or PUCCH format 4, $N^{PUCCH}_{symb-UCI}$ may be a value obtained by subtracting the number of OFDM symbols used for DMRSs associated with the PUCCH resource for the PUCCH 400b from the number of OFDM symbols of the PUCCH resource for the PUCCH 400b.

In a case that the PUCCH resource for the PUCCH 400b is in PUCCH format 3 or PUCCH format 4 and does not satisfy Expression (19), then from one or multiple CSI parts 2 included in the $N_{total}$ channel state information reports, $N^{selected}_{CSI-part2}$ CSI parts 2 having the highest priority may be provided. The value $N^{selected}_{CSI-part2}$ may satisfy Expression (22) and Expression (23). $N^{selected}_{CSI-part2}$ may be given based at least on some or all of $O_{CSI-part2,N}$, $O_{CRC,CSI-part2,N}$, $M^{PUCCH}_{RB}$, $N^{RB}_{sc,ctrl}$, $N^{PUCCH}_{symb-UCI}$, $O_{ACK}$, $O_{SR}$, $O_{CSI-part1,n}$, $O_{CRC,CSI-part1}$, $Q_m$, r, $O_{CSI-part2,N+1}$, and $O_{CRC,CSI-part2,N+1}$.

$$O_{CSI-part2,N} + O_{CRC,CSI-part2,N} \leq \left[ M^{PUCCH}_{RB} \cdot N^{RB}_{sc,ctrl} \cdot N^{PUCCH}_{symb-UCI} - \text{ceil}\left(\left(O_{ACK} + O_{SR} + \sum_{n=1}^{N_{total}} O_{CSI-part1,n} + O_{CRC,CSI-part1}\right) \middle/ (Q_m \cdot r)\right) Q_m \cdot r \right] \quad \text{[Expression 22]}$$

$$O_{CSI-part2,N+1} + O_{CRC,CSI-part2,N+1} > \left[ M^{PUCCH}_{RB} \cdot N^{RB}_{sc,ctrl} \cdot N^{PUCCH}_{symb-UCI} - \text{ceil}\left(\left(O_{ACK} + O_{SR} + \sum_{n=1}^{N_{total}} O_{CSI-part1,n} + O_{CRC,CSI-part1}\right) \middle/ (Q_m \cdot r)\right) Q_m \cdot r \right] \quad \text{[Expression 23]}$$

Here, $O_{CSI-part2,N}$ may be the number of bits in the $N^{selected}_{CSI-part2}$ CSI parts 2 included in the $N_{total}$ channel state information reports and having the highest priority. Additionally, $O_{CSI-part2,N}$ may be given based on Expression (24).

$$O_{CSI-part2,N} = \sum_{n=1}^{N_{CSI-part2}^{selected}} O_{CSI-part2,n} \quad \text{[Expression 24]}$$

Here, $O_{CSI-part2,n}$ may be the number of bits in the CSI parts 2 included in the $N^{selected}_{CSI-part2}$ channel state information reports multiplexed on the PUCCH 400b. Additionally, $O_{CSI-part2,n}$ may be given based at least on the value of the rank indicator set in each of the $N^{selected}_{CSI-part2}$ channel state information reports. In addition, $O_{CSI-part2,n}$ is the number of bits in the CSI part 2 included in the n-th channel state information report.

Additionally, $O_{CRC,CSI-part2,N}$ indicates CRC bits corresponding to $O_{CSI-part2,N}$. In addition, $O_{CSI-part1,n}$ is the number of bits in the CSI part1 included in the n-th channel state information report. Additionally, $O_{CRC,CSI-part1}$ is the number of CRC bits corresponding to the sum of the number $O_{ACK}$ of bits in the HARQ-ACK information, the number $O_{SR}$ of bits in the SR, and the number $O_{CSI-part1,N}$ of bits in the CSI parts 1 included in the $N_{total}$ channel state information reports.

Additionally, $O_{CSI-part2,N+1}$ may be the number of bits in $N^{selected}_{CSI-part2}+1$ CSI parts 2 included in the $N_{total}$ channel state information reports and having the highest priority. In addition, $O_{CSI-part2,N+1}$ may be given based on Expression (25).

$$O_{CSI-part2,N+1} = \sum_{n=1}^{N_{CSI-part2}^{selected}+1} O_{CSI-part2,n} \quad \text{[Expression 25]}$$

Additionally, $O_{CRC,CSI-part2,N+1}$ is the number of CRC bits corresponding to $O_{CSI-part2,N+1}$.

ceil (A) may be a ceiling function of A. Additionally, ceil (A) may be a function providing a minimum integer within the range in which the integer is not smaller than A.

In determination of $N^{selected}_{CSI-part2}$, $O_{CSI-part2,N\_ref}$ may be given based at least on the assumption that the rank indicator in the n-th channel state information report is set to a prescribed value. For example, in determination of $N^{selected}_{CSI-part2}$, $O_{CSI-part2,N\_ref}$ may be given based on Expression (26).

$$O_{CSI-part2,N\_ref} = \sum_{n=1}^{N_{CSI-part2}^{selected}} O_{CSI-part2,n,ref} \quad \text{[Expression 26]}$$

Additionally, $O_{CSI-part2,N\_ref}$ may be the number of bits in $N^{selected}_{CSI-part2}$ channel state information reports given based at least on the assumption that the rank indicator in each of the $N^{selected}_{CSI-part2}$ channel state information reports is set to a prescribed value. In addition, in determination of $N^{selected}_{CSI-part2}$, $O_{CSI-part2,N+1\_ref}$ may be given based at least on the assumption that the rank indicator in the n-th channel state information report is set to a prescribed value. For example, in determination of $N^{selected}_{CSI-part2}$, $O_{CSI-part2,N+1\_ref}$ may be given based on Expression (27).

$$O_{CSI-part2,1\_ref} = \sum_{n=1}^{N_{CSI-part2}^{selected}+1} O_{CSI-part2,n,ref} \quad \text{[Expression 27]}$$

Here, $O_{CSI-part2,N+1\_ref}$ may be the number of bits in the CSI parts 2 included in $N^{selected}_{CSI-part2}+1$ channel state information reports, the CSI parts 2 being given based at least on the assumption that the rank indicator in each of the $N^{selected}_{CSI-part2}+1$ channel state information reports is set to a prescribed value.

Figure 13:
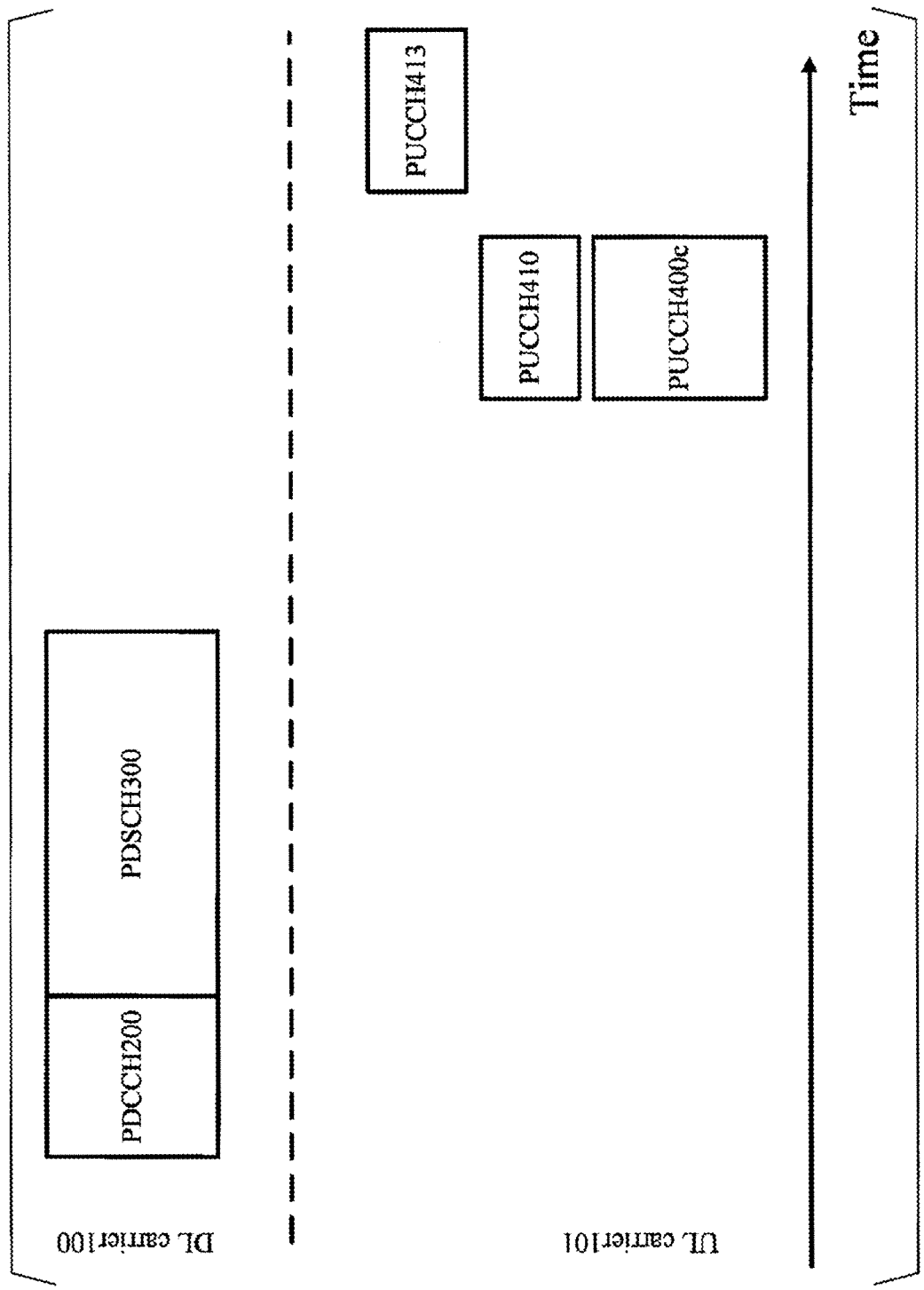
FIG. 13 is a diagram illustrating an example of reception of transport blocks and transmission of HARQ-ACK information corresponding to the transport blocks, an SR, and channel state information according to an aspect of the present embodiment.

FIG. 13 is a diagram illustrating an example of reception of transport blocks and transmission of HARQ-ACK information corresponding to the transport blocks, an SR, and a channel state information report according to an aspect of the present embodiment. The number of bits included in the HARQ-ACK information is $O_{ACK}$. In the downlink carrier (DL carrier) 100, the PDCCH 200 is transmitted. The DCI format 201 included in the PDCCH 200 indicates the allocation of the frequency resource for the PDSCH 300 and/or the allocation of the time resource for the PDSCH 300. In the uplink carrier (UL carrier) 101, a PUCCH 400c is used for transmission of the HARQ-ACK information corresponding to transport blocks included in the PDSCH 300. The PUCCH 410 is configured for the channel state information report 420 and the PUCCCH 413 is configured for the channel state information report 423. Here, it is assumed that the channel state information report 420 has a higher priority than the channel state information report 423. In FIG. 13, it is assumed that the PUCCH 400c and the PUCCH 410 collide. In FIG. 13, it is assumed that the PUCCH 400c and the PUCCH 413 do not collide.

The PUCCH resource for the PUCCH 400c is given based at least on one PUCCH resource set selected from one or multiple PUCCH resource sets and the value of the PUCCH resource indication field included in the DCI format 201. The one PUCCH resource set may be given based at least on $N_{UCI}$ being set to $O_{ACK}+O_{SR}$ $O_{CSI}$ The PUCCH resource may be one or multiple PUCCH resources included in the one PUCCH resource set and corresponding to the value in the PUCCH resource indication field.

$O_{ACK}$ bits of HARQ-ACK information and the channel state information report 420 may be multiplexed on the PUCCH 400c. In determination of a value $N_{UCI}$, $O_{CSI}$ may be the number of bits in the channel state information report 420. In determination of the value $N_{UCI}$, $O_{CSI}$ may be the number of bits in the channel state information report 420 given based on the assumption that the rank indicator in the channel state information report 420 is set to 1. In a case that $O_{ACK}$ bits of HARQ-ACK information and the channel state information report 420 are multiplexed on the PUCCH 400c, the channel state information report 423 need not be multiplexed on the PUCCH 400c.

$O_{ACK}$ bits of HARQ-ACK information and the channel state information report 420 and the channel state information report 423 may be multiplexed on the PUCCH 400c. In determination of the value $N_{UCI}$, $O_{CSI}$ may be the sum of bits in the channel state information report 420 and the channel state information report 423. In determination of the value $N_{UCI}$, $O_{CSI}$ may be the sum of bits in the channel state information report 420 and the channel state information report 423 given on the assumption that the rank indicator in each of the channel state information report 420 and the channel state information report 423 is set to 1.

Whether the channel state information report 423 is multiplexed on the PUCCH 400c or not may be given based at least on the higher layer parameter Multi-CSI-PUCCH-ResourceList. In a case that the higher layer parameter Multi-CSI-PUCCH-ResourceList is configured, the channel state information report 423 may be multiplexed on the PUCCH 400c. In a case that the higher layer parameter Multi-CSI-PUCCH-ResourceList is not configured, the channel state information report 423 need not be multiplexed on the PUCCH 400c.

Figure 14:
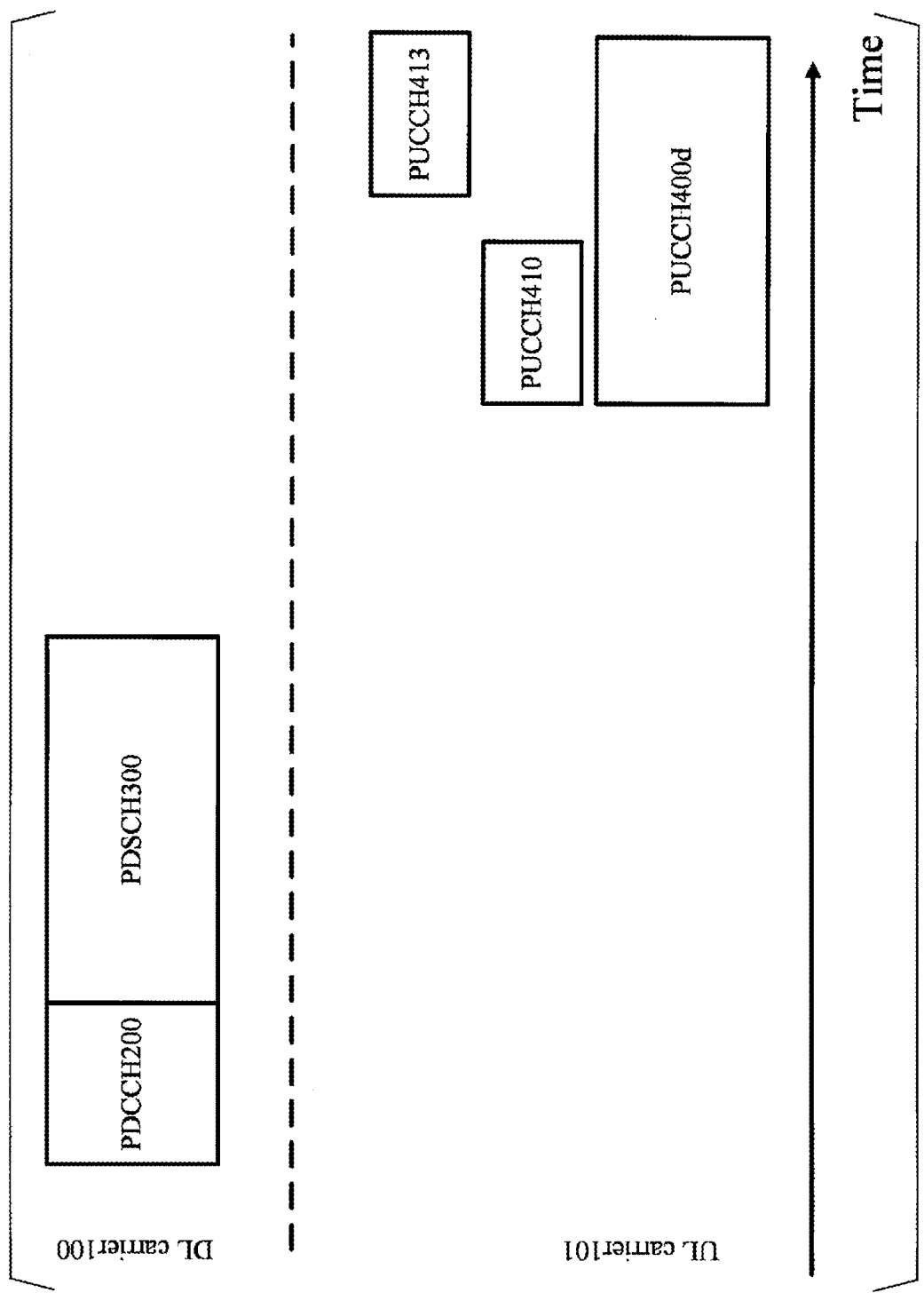
FIG. 14 is a diagram illustrating an example of reception of transport blocks and transmission of HARQ-ACK information corresponding to the transport blocks, an SR, and channel state information according to an aspect of the present embodiment.

FIG. 14 is a diagram illustrating an example of reception of transport blocks and transmission of HARQ-ACK information corresponding to the transport blocks, an SR, and channel state information according to an aspect of the present embodiment. The number of bits included in the HARQ-ACK information is $O_{ACK}$ In the downlink carrier (DL carrier) 100, the PDCCH 200 is transmitted. The DCI format 201 included in the PDCCH 200 indicates the allocation of the frequency resource for the PDSCH 300 and/or the allocation of the time resource for the PDSCH 300. In the uplink carrier (UL carrier) 101, a PUCCH 400d is used for transmission of the HARQ-ACK information corresponding to transport blocks included in the PDSCH 300. The PUCCH 410 is configured for the channel state information report 420 and the PUCCCH 413 is configured for the channel state information report 423. Here, it is assumed that the channel state information report 420 has a higher priority than the channel state information report 423. It is assumed that the PUCCH 400d and the PUCCH 410 collide in 13. Additionally, in FIG. 13, it is assumed that the PUCCH 400d and the PUCCH 413 collide.

The PUCCH resource for the PUCCH 400d is given based at least on one PUCCH resource set selected from one or multiple PUCCH resource sets and the value in the PUCCH resource indication field included in the DCI format 201. The one PUCCH resource set may be given based at least on $N_{UCI}$ being set to $O_{ACK}+O_{SR}+O_{CSI}$ The PUCCH resource may be one or multiple PUCCH resources included in the one PUCCH resource set and corresponding to the value in the PUCCH resource indication field.

$O_{ACK}$ bits of HARQ-ACK information and the channel state information report 420 may be multiplexed on the PUCCH 400d. In determination of the value $N_{UCI}$, $O_{CSI}$ may be the number of bits in the channel state information report 420. In determination of the value $N_{UCI}$, $O_{CSI}$ may be the number of bits in the channel state information report 420 given based on the assumption that the rank indicator in the channel state information report 420 is set to 1. In a case that $O_{ACK}$ bits of HARQ-ACK information and the channel state information report 420 are multiplexed on the PUCCH 400d, the channel state information report 423 need not be multiplexed on the PUCCH 400d.

$O_{ACK}$ bits of HARQ-ACK information and the channel state information report 420 and the channel state information report 423 may be multiplexed on the PUCCH 400c. In determination of the value $N_{UCI}$, $O_{CSI}$ may be the sum of bits in the channel state information report 420 and the channel state information report 423. In determination of the value $N_{UCI}$, $O_{CSI}$ may be the sum of bits in the channel state information report 420 and the channel state information report 423 given on the assumption that the rank indicator in each of the channel state information report 420 and the channel state information report 423 is set to 1.

Whether the channel state information report 423 is multiplexed on the PUCCH 400d or not may be given based at least on the higher layer parameter Multi-CSI-PUCCH-ResourceList. In a case that the higher layer parameter Multi-CSI-PUCCH-ResourceList is configured, the channel state information report 423 may be multiplexed on the PUCCH 400d. In a case that the higher layer parameter Multi-CSI-PUCCH-ResourceList is not configured, the channel state information report 423 need not be multiplexed on the PUCCH 400d.

Various aspects of apparatuses according to one aspect of the present embodiment will be described below.

(1) To accomplish the object described above, aspects of the present invention are contrived to provide the following measures. That is, a first aspect of the present invention is a terminal apparatus including a memory and a processor connected to the memory, wherein the processor is configured to perform (channel/interference) measurements for a channel state information report, multiplex, among $N_{total}$ channel state information reports, $N^{selected}_{CSI}$ channel state information reports having a highest priority, on a PUCCH, and, transmit the PUCCH in a certain slot, and the $N^{selected}_{CSI}$ channel state information reports are given based on an assumption that a rank indicator in each of the $N^{selected}_{CSI}$ channel state information reports is set to a prescribed value.

(2) Additionally, in the first aspect of the present invention, in the $N^{selected}_{CSI}$ channel state information reports multiplexed on the PUCCH, a first number $O_{CSI,N}$ of bits is given based on a value of the rank indicator included in each of the $N^{selected}_{CSI}$ channel state information reports, and the value of the rank indicator included in each of the $N^{selected}_{CSI}$ channel state information reports is selected by the terminal apparatus.

(3) Additionally, in the first aspect of the present invention, the $N^{selected}_{CSI}$ channel state information reports are given based at least on a second number $O_{CSI,N,ref}$ of bits, and the second number $O_{CSI,N,ref}$ of bits is given based on an assumption that the rank indicator in each of the $N^{selected}_{CSI}$ channel state information reports is set to a prescribed value.

(4) Additionally, in the first aspect of the present invention, the prescribed value for the rank indicator in each of the $N^{selected}_{CSI}$ channel state information reports is a maximum value of a set of rank indicators permitted based on a higher layer parameter RankRestriction configured for each of the $N^{selected}_{CSI}$ channel state information reports.

(5) A second aspect of the present invention is a base station apparatus including a memory and a processor connected to the memory, wherein the processor is configured to indicate, to a terminal apparatus, (channel/interference) measurements for a channel state information report and receive a PUCCH on which, among $N_{total}$ channel state information reports, $N^{selected}_{CSI}$ channel state information reports having a highest priority are multiplexed, and the $N^{selected}_{CSI}$ channel state information reports are given based on an assumption that a rank indicator in each of the $N^{selected}_{CSI}$ channel state information reports is set to a prescribed value.

(6) Additionally, in the second aspect of the present invention, in the $N^{selected}_{CSI}$ channel state information reports multiplexed on the PUCCH, a first number $O_{CSI,N}$ of bits is given based on a value of the rank indicator included in each of the $N^{selected}_{CSI}$ channel state information reports, and the value of the rank indicator included in each of the $N^{selected}_{CSI}$ channel state information reports is selected by the terminal apparatus.

(7) Additionally, in the second aspect of the present invention, the $N^{selected}$ CSI channel state information reports are given based at least on a second number $O_{CSI,N,ref}$ of bits, and the second number $O_{CSI,N,ref}$ of bits is given based on an assumption that the rank indicator in each of the $N^{selected}_{CSI}$ channel state information reports is set to a prescribed value.

(8) Additionally, in the second aspect of the present invention, the prescribed value for the rank indicator in each of the $N^{selected}_{CSI}$ channel state information reports is a maximum value of a set of rank indicators permitted based on a higher layer parameter RankRestriction configured for each of the $N^{selected}_{CSI}$ channel state information reports.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Moreover, the base station apparatus 3 according to the above-described embodiment may be an Evolved Universal Terrestrial Radio Access Network (EUTRAN) and/or a NextGen RAN (NG-RAN, NR RAN). Moreover, the base station apparatus 3 according to the above-described embodiment may have some or all of the functions of a higher node for an eNodeB and/or a gNB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

The invention claimed is:
1. A terminal device comprising:
reception circuitry configured to receive a physical downlink shared channel (PDSCH); and
transmission circuitry configured to multiplex, if multi-CSI-PUCCH-ResourceList is not configured, a first channel state information (CSI) with a hybrid auto repeat request-acknowledgement (HARQ-ACK) for the PDSCH and not to multiplex a second CSI with the first CSI and the HARQ-ACK in a case that at least one OFDM symbol of multiple OFDM symbols to which a first physical uplink control channel (PUCCH) for the first CSI is mapped is same as one OFDM symbol of multiple OFDM symbols to which a third PUCCH for the HARQ-ACK is mapped, and at least one OFDM symbol of multiple OFDM symbols to which a second PUCCH for the second CSI is mapped is same as one

OFDM symbol of multiple OFDM symbols to which the third PUCCH is mapped, wherein the first CSI being with higher priority than the second CSI, each OFDM symbol of multiple OFDM symbols to which the first PUCCH for the first CSI is mapped is different from any OFDM symbol of multiple OFDM symbols to which the second PUCCH for the second CSI is mapped, and the transmission circuitry configured to multiplex, if the multi-PUCCH-ResourceList is configured, the second CSI with the first CSI and the HARQ-ACK.

2. A base station device comprising:

transmission circuitry configured to transmit a physical downlink shared channel (PDSCH); and reception circuitry configured to receive a physical uplink control channel (PUCCH) resource, wherein, a first channel state information (CSI) with a hybrid auto repeat request-acknowledgment (HARQ-ACK), for the PDSCH are multiplexed if multi-CSI-PUCCH-ResourceList is not configured, and a second CSI with the first CSI and the HARQ-ACK are not multiplexed, in a case that at least one OFDM symbol of multiple OFDM symbols to which a first PUCCH for the first CSI is mapped is same as one OFDM symbol of multiple OFDM symbols to which a third PUCCH for the HARQ-ACK is mapped, and at least one OFDM symbol of multiple OFDM symbols to which a second PUCCH for the second CSI is mapped is same as one OFDM symbol of multiple OFDM symbols to which the third PUCCH is mapped, wherein the first CSI being with higher priority than the second CSI, each OFDM symbol of multiple OFDM symbols to which the first PUCCH for the first CSI is mapped is different from any OFDM symbol of multiple OFDM symbols to which the second PUCCH for the second CSI is mapped, and the reception circuitry is configured to receive the PUCCH resource, if the multi-CSI-PUCCH-ResourceList is configured, the second CSI with the first CSI and the HARQ-ACK are multiplexed.

3. A communication method using a terminal device, the communication method comprising:

receiving a physical downlink shared channel (PDSCH); and multiplexing, if multi-CSI-PUCCH-ResourceList is not configured, a first channel state information (CSI) with a hybrid auto repeat request-acknowledgement (HARQ-ACK) for the PDSCH and not to multiplexing a second CSI with the first CSI and the HARQ-ACK in a case that at least one OFDM symbol of multiple OFDM symbols to which a first physical uplink control channel (PUCCH) for the first CSI is mapped is same as one OFDM symbol of multiple OFDM symbols to which a third PUCCH for the HARQ-ACK is mapped, and at least one OFDM symbol of multiple OFDM symbols to which a second PUCCH for the second CSI is mapped is same as one OFDM symbol of multiple OFDM symbols to which the third PUCCH is mapped, wherein the first CSI being with higher priority than the second CSI, each OFDM symbol of multiple OFDM symbols to which the first PUCCH for the first CSI is mapped is different from any OFDM symbol of multiple OFDM symbols to which the second PUCCH for the second CSI is mapped, and multiplexing, if the multi-CSI-PUCCH-ResourceList is configured, the second CSI with the first CSI and the HARQ-ACC.

4. A communication method using a base station device, the communication method comprising:

transmitting a physical downlink shared channel (PDSCH); and receiving a physical uplink control channel (PUCCH) resource, wherein, a first channel state information (CSI) with a hybrid auto repeat request-acknowledgement (HARQ-ACK) for the PDSCH are multiplexed if multi-CSI-PUCCH-ResourceList is not configured, and a second CSI with the first CSI and the HARQ-ACK are not multiplexed, in a case that at least one OFDM symbol of multiple OFDM symbols to which a first PUCCH for the first CSI is mapped is same as one OFDM symbol of multiple OFDM symbols to which a third PUCCH for the HARQ-ACK is mapped, and at least one OFDM symbol of multiple OFDM symbols to which a second PUCCH for the second CSI is mapped is same as one OFDM symbol of multiple OFDM symbols to which the third PUCCH is mapped, wherein the first CSI being with higher priority than the second CSI, each OFDM symbol of multiple OFDM symbols to which the first PUCCH for the first CSI is mapped is different from any OFDM symbol of multiple OFDM symbols to which the second PUCCH for the second CSI is mapped, and receiving the PUCCH resource, if the mufti-CSI-PUCCH-ResourceList is configured, the second CSI with the first CSI and the HARQ-ACK are multiplexed.

* * * * *